(12) United States Patent
Norman, Jr.

(10) Patent No.: US 8,626,478 B1
(45) Date of Patent: Jan. 7, 2014

(54) CROSS FLOW PARAMETER CALCULATION FOR AERODYNAMIC ANALYSIS

(75) Inventor: David Norman, Jr., Houston, TX (US)

(73) Assignee: The Boeing Company, Chicago, IL (US)

( * ) Notice: Subject to any disclaimer, the term of this patent is extended or adjusted under 35 U.S.C. 154(b) by 215 days.

(21) Appl. No.: 13/166,161

(22) Filed: Jun. 22, 2011

Related U.S. Application Data

(60) Provisional application No. 61/365,275, filed on Jul. 16, 2010.

(51) Int. Cl.
*G06F 17/10* (2006.01)
*G06N 7/06* (2006.01)

(52) U.S. Cl.
USPC ........................................ 703/9; 703/2; 703/6

(58) Field of Classification Search
USPC ..................................................... 703/1, 8, 9
See application file for complete search history.

(56) References Cited

U.S. PATENT DOCUMENTS

| | | |
|---|---|---|
| 5,569,343 A | 10/1996 | Garrigus |
| 5,753,570 A | 5/1998 | Garrigus |
| 5,759,699 A | 6/1998 | French |
| 5,955,387 A | 9/1999 | Garrigus |
| 5,980,980 A | 11/1999 | DiChiara, Jr. et al. |
| 6,418,973 B1 | 7/2002 | Cox et al. |
| 6,479,104 B1 | 11/2002 | DiChiara, Jr. et al. |
| 6,716,407 B2 | 4/2004 | Davis et al. |
| 6,844,057 B2 | 1/2005 | DiChiara, Jr. |
| 6,844,091 B2 | 1/2005 | Denham et al. |
| 6,852,271 B1 | 2/2005 | DiChiara, Jr. |
| 6,855,917 B2 | 2/2005 | Matsen et al. |
| 6,866,733 B1 | 3/2005 | Denham et al. |
| 6,969,546 B2 | 11/2005 | DiChiara, Jr. |
| 2008/0176020 A1 | 7/2008 | Heng et al. |
| 2009/0004425 A1 | 1/2009 | Lehman et al. |
| 2009/0005232 A1 | 1/2009 | Hand et al. |
| 2009/0012931 A1* | 1/2009 | Appa et al. ........................ 707/2 |
| 2009/0019685 A1 | 1/2009 | Keith et al. |
| 2009/0035510 A1 | 2/2009 | Chakrabarti |
| 2009/0044896 A1 | 2/2009 | Adam et al. |
| 2009/0199565 A1 | 8/2009 | Brown et al. |
| 2009/0226746 A1 | 9/2009 | Chakrabarti et al. |
| 2009/0263627 A1 | 10/2009 | Hand et al. |
| 2009/0266870 A1 | 10/2009 | Yousefiani et al. |
| 2009/0269497 A1 | 10/2009 | Yousefiani et al. |

OTHER PUBLICATIONS

Campbell et al., Orbiter Return-To-Flight Entry Aeroheating, AIAA Paper-2006-2917, Jun. 2006.*
Greene et al., Development of a Boundary Layer Properties Interpolation Tool in Support of Orbiter Return-To-Flight, AIAA Paper-2006-2920, Jun. 2006.*
Giles et al., "Use of an engineering data management system in the analysis of space shuttle orbiter tiles." (1981).*

* cited by examiner

*Primary Examiner* — Kamini S Shah
*Assistant Examiner* — Michael P Healey
(74) *Attorney, Agent, or Firm* — Yee & Associates, P.C.

(57) ABSTRACT

A system and method for determining a cross flow angle for a feature on a structure. A processor unit receives location information identifying a location of the feature on the structure, determines an angle of the feature, identifies flow information for the location, determines a flow angle using the flow information, and determines the cross flow angle for the feature using the flow angle and the angle of the feature. The flow information describes a flow of fluid across the structure. The flow angle comprises an angle of the flow of fluid across the structure for the location of the feature.

20 Claims, 14 Drawing Sheets

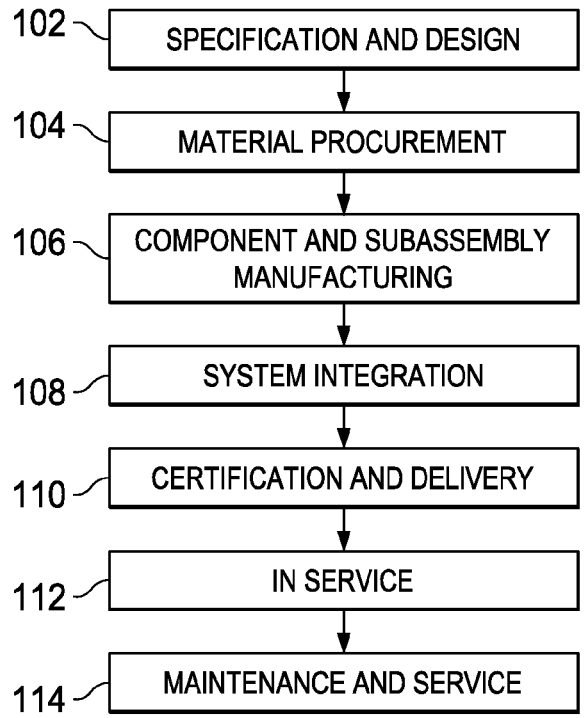
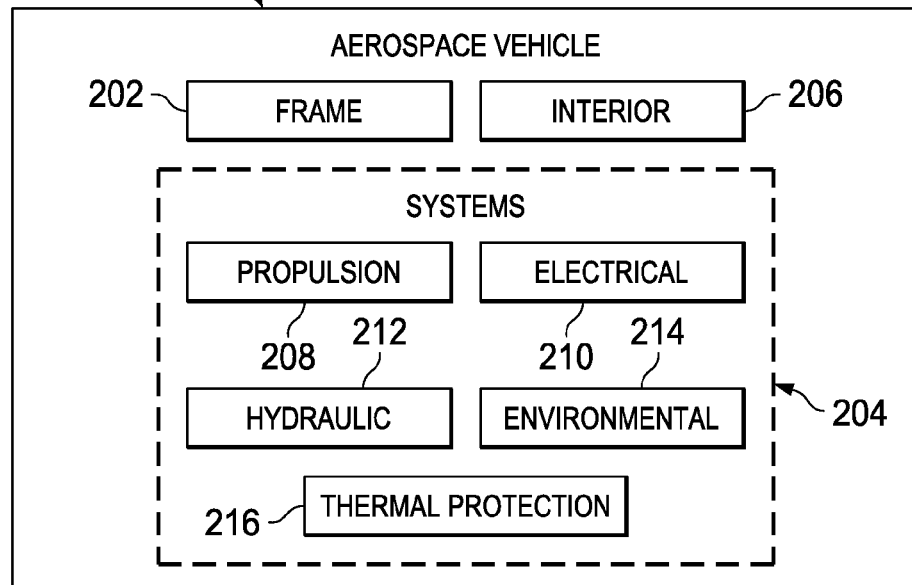

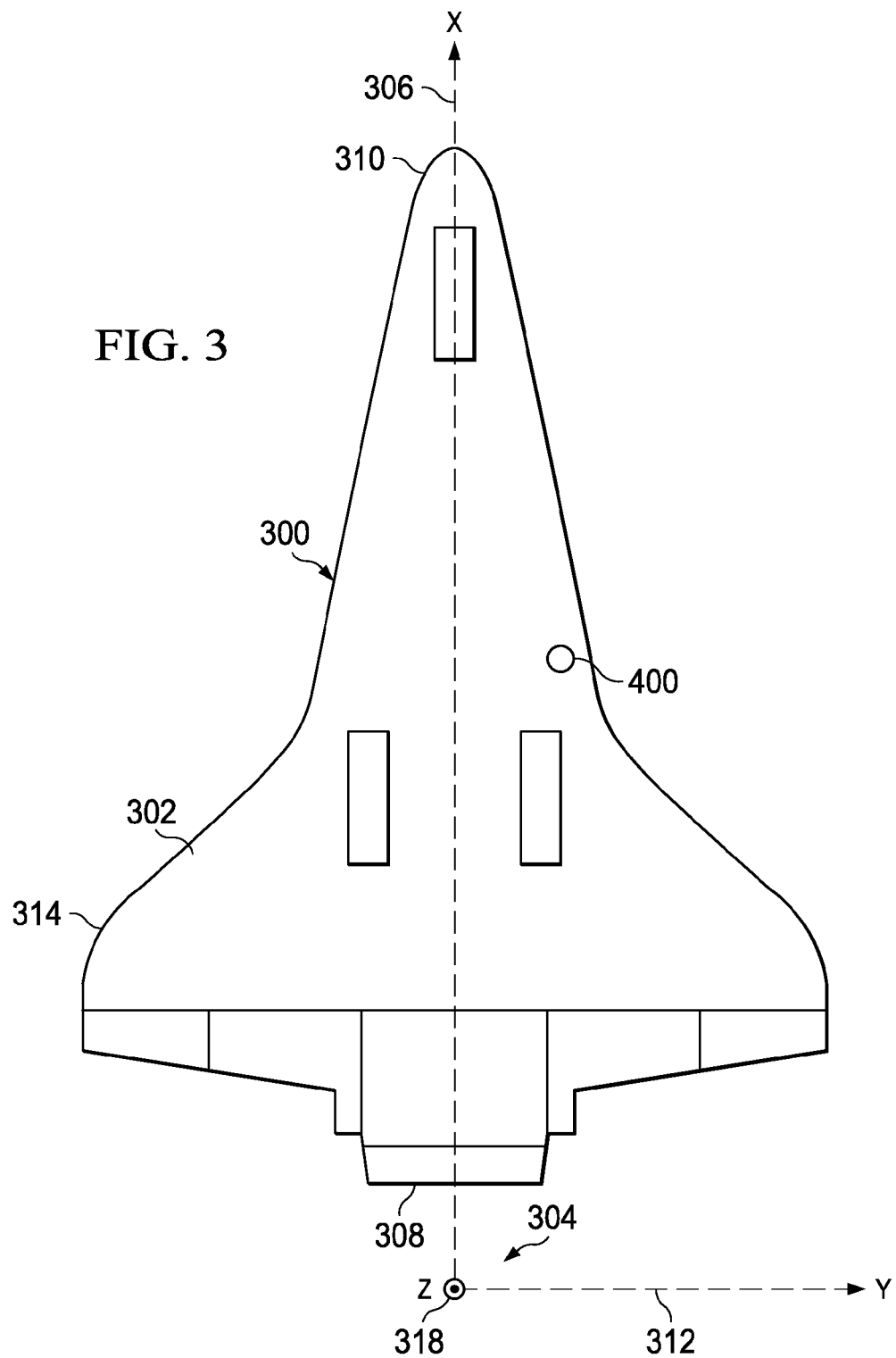

Cavity and Flow Properties ☒

CAVITY

Midpoint coordinate of one side of cavity

802 ⦿  X: 7    Y: -15    Z: 24  } 806

Midpoint coordinate of the other side of cavity

X: 8    Y: -13    Z: 24  } 808

OR

Cavity Angle

804 ○  [       ] — 810

FLOW (Derived from wall shear stress components)

X Shear Stress    Y Shear Stress

812 ⦿  300    250  } 818

OR

Shear angle

814 ○  [       ] — 820

OR

816 ○  Use Mach 18 Properties

Enter Cutoff Angle: (angle under which CrossFlow is negligible)    10  — 822

[ GO! ] — 824

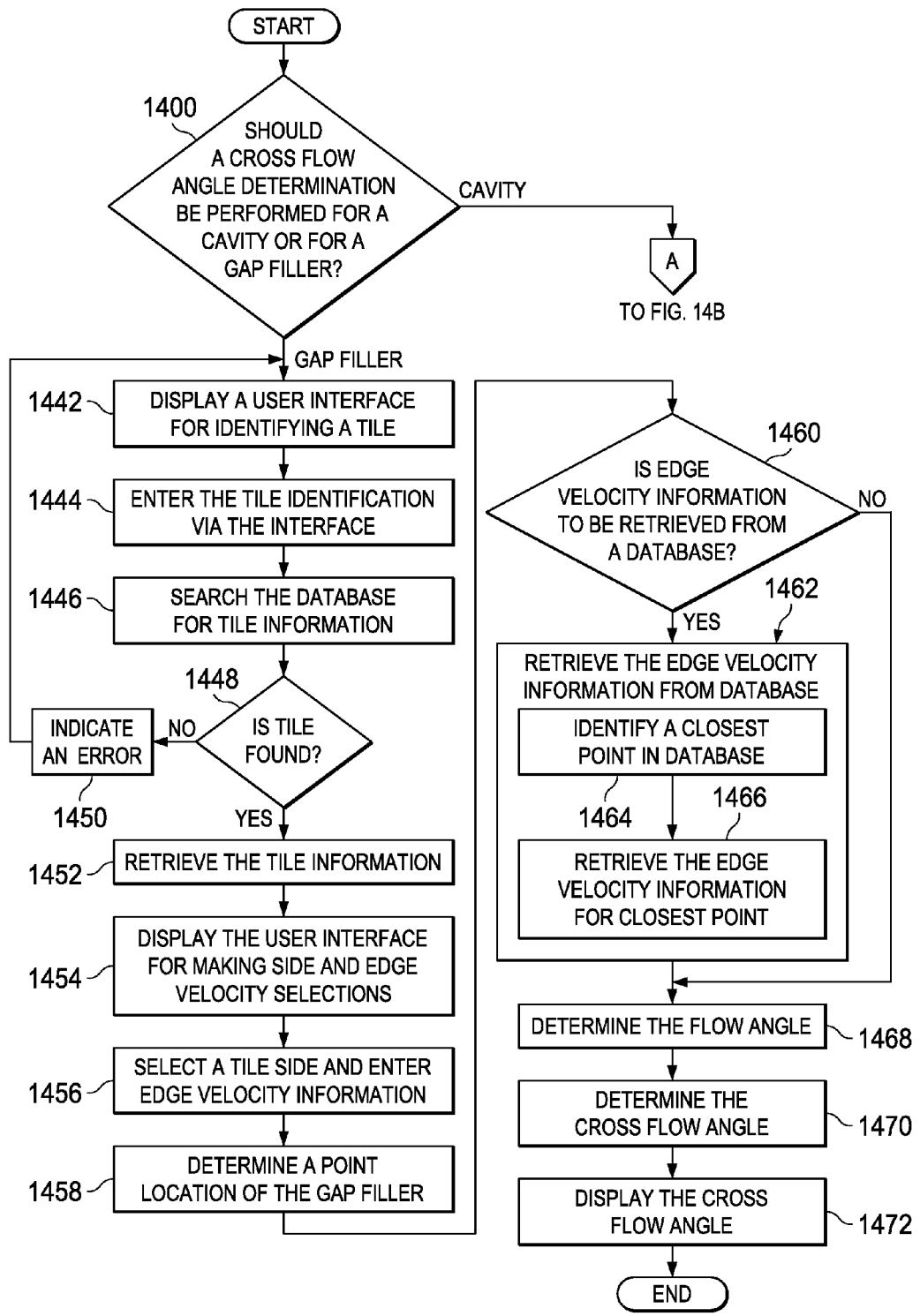

CROSS FLOW PARAMETER CALCULATION FOR AERODYNAMIC ANALYSIS

CROSS FLOW PARAMETER CALCULATION FOR AERODYNAMIC ANALYSIS

This application claims the benefit of U.S. Provisional Patent Application No. 61/365,275, filed on Jul. 16, 2010, which is hereby incorporated by reference.

GOVERNMENT LICENSE RIGHTS

This invention was made with Government support under Boeing subcontract 6000132079 awarded by United Space Alliance under Prime Contract No. NNJ06VA01C awarded by NASA, and is subject to the provisions of Section 305 of the National Aeronautics and Space Act of 1958 (72 Stat. 435: 42 U.S.C. 2457).

BACKGROUND INFORMATION

1. Field:

The present disclosure relates generally to systems and methods for analyzing aerodynamic effects of features in the surface of a vehicle. More particularly, the present disclosure relates to systems and methods for designing, making, and verifying the reworking of inconsistencies in thermal protection systems for aerospace vehicles by calculating cross flows over the surfaces of such vehicles.

2. Background:

Aerodynamic heating is the heating of a solid body produced by frictional interactions with the passage of fluid about the body. For example, aerodynamic heating occurs when air passes over an aerospace vehicle, such as a spacecraft or aircraft, during vehicle transit, ascent, descent, and reentry. In this case, aerodynamic heating of the vehicle is a function of various parameters, such as reentry angle, vehicle speed, air density, and vehicle configuration, among other parameters. Another parameter affecting aerodynamic heating of an aerospace vehicle is the thermal protection system materials that are used to protect the vehicle from aerodynamic and other heating. For example, depending on the vehicle configuration and thermal protection system material properties, aerodynamic heating typically increases as the air surrounding the vehicle increases in density and as the air passes more quickly over the vehicle. An increase in the speed at which air passes over a vehicle typically occurs as the speed of the vehicle increases.

Aerodynamic heating considerations may have many effects on aerospace vehicle design and operation. For example, aerodynamic heating may affect the performance of an aerospace vehicle. The thermal protection system configuration and materials that are needed for a vehicle may be based on the levels of aerodynamic heating expected to be experienced by the vehicle during operation. Aerodynamic heating actually experienced by an aerospace vehicle during operation may affect how often inspections and maintenance are needed. Levels and durations of aerodynamic heating experienced during vehicle operation may affect whether the vehicle should be reconfigured, reworked, or replaced.

A vehicle thermal protection system may be used to reduce or control the effects of aerodynamic heating on an aerospace vehicle structure to within acceptable limits. For example, an aerospace vehicle may be a vehicle that travels at supersonic, hypersonic, exo-orbital, and exoatmospheric speeds, and a spacecraft that reenters the atmosphere. A thermal protection system for such an aerospace vehicle may include a barrier to protect the vehicle from aerodynamic heating when the vehicle renters the atmosphere. For example, the thermal protection system may include material that covers the surfaces of the vehicle that are exposed to air during reentry. Examples of materials that may be used for a vehicle thermal protection system include silica glass fiber materials, ceramic matrix composite (CMC) materials, polymeric matrix composite (PMC) materials, and other materials, as well as such materials that may be clad with ablative, high-temperature resistant, or other coating materials.

A space shuttle is an example of an aerospace vehicle. On a space shuttle, most of the thermal protection system takes the form of tiles that are attached to the surfaces of the vehicle that are exposed to aerodynamic heating during reentry. For example, these tiles may be located on the lower surface of the space shuttle, among other suitable places thereon. The tiles on the space shuttle are made of an insulating material known to those having knowledge in the relevant arts to be a silica glass fiber material. The insulating tiles absorb and radiate heat, while minimizing heat load conduction to the aluminum airframe of the space shuttle.

Inconsistencies may occur in the thermal protection system tiles of a space shuttle, in the materials used to attach the tiles to the shuttle surface, and in materials used to seal and fill gaps and channels between the tiles. Inconsistencies may include nicks, dings, scrapes, or what those skilled in the art may refer to generally as cavities, in the surface of the thermal protection system tiles. Inconsistencies also may include material that becomes lodged between tiles of the thermal protection system. Such inconsistencies may be referred to as gap fillers by those skilled in the art. Inconsistencies in a vehicle thermal protection system may arise or occur during pre-flight preparation, as well as during operation of an aerospace vehicle, such as the space shuttle. Such undesirable inconsistencies may affect the aerodynamic characteristics of the tiles and, therefore, may affect performance of the space shuttle thermal protection system. Similar issues may arise in other types of thermal protection systems that are used in other types of aerospace vehicles and in thermal protection systems that may employ other thermal protection system materials, such as ceramic matrix composite materials, polymeric matrix composite materials, or other materials.

Accordingly, it would be advantageous to have a method and apparatus that takes into account one or more of the issues discussed above, as well as possibly other issues.

SUMMARY

A method for determining a cross flow angle for a feature on a structure is provided. Location information identifying a location of a feature on a structure is received by a processor unit. An angle of the feature is determined using the processor unit. Flow information for the location is identified. The flow information describes a flow of fluid across the structure. A flow angle is determined using the flow information. The flow angle comprises an angle of the flow of fluid across the structure for the location of the feature. The cross flow angle for the feature is determined by the processor unit using the flow angle and the angle of the feature.

An apparatus for determining a cross flow angle for a feature on a structure also is provided. The apparatus comprises a processor unit. The processor unit is configured to receive location information identifying a location of a feature on a structure, to determine an angle of the feature, to identify flow information for the location, to determine a flow angle using the flow information, and to determine the cross flow angle for the feature using the flow angle and the angle of the feature. The flow information describes a flow of fluid across the structure. The flow angle comprises an angle of the flow of fluid across the structure for the location of the feature.

A computer program product for determining a cross flow angle for a feature on a structure also is provided. The computer program product comprises a computer readable storage medium and program instructions stored on the computer readable storage medium. First program instructions receive location information identifying a location of a feature on a structure. Second program instructions determine an angle of the feature. Third program instructions identify flow information for the location. Fourth program instructions determine a flow angle using the flow information. Fifth program instructions determine the cross flow angle for the feature using the flow angle and the angle of the feature. The flow information describes a flow of fluid across the structure. The flow angle comprises an angle of the flow of fluid across the structure for the location of the feature.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 1 is an illustration of an aerospace vehicle manufacturing and service method in accordance with an advantageous embodiment;

FIG. 2 is an illustration of a block diagram of an aerospace vehicle in accordance with an advantageous embodiment;

FIG. 3 is an illustration of a space shuttle in accordance with an advantageous embodiment;

FIG. 8 is an illustration of a user interface for obtaining cavity information that may be used for determining a cross flow angle for a cavity in accordance with an advantageous embodiment;

FIGS. 14A and 14B are illustrations of a flowchart of another process for determining cross flow angles in accordance with an advantageous embodiment.

DETAILED DESCRIPTION

Figure 4:
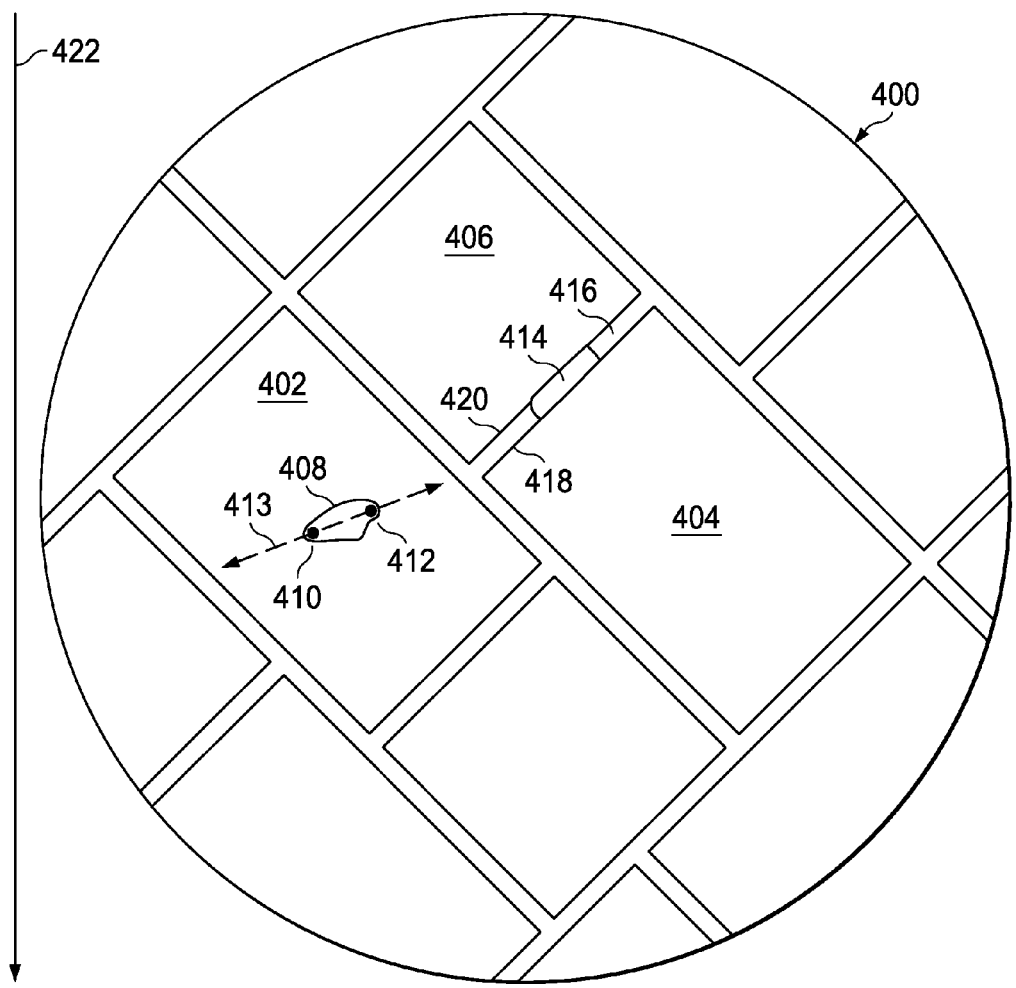
FIG. 4 is an illustration showing a portion of the lower surface of a space shuttle in accordance with an advantageous embodiment.

Referring more particularly to the drawings, embodiments of the disclosure may be described in the context of an aerospace vehicle manufacturing and service method 100 as shown in FIG. 1 and an aerospace vehicle 200 as shown in FIG. 2. Turning first to FIG. 1, an illustration of the aerospace vehicle manufacturing and service method 100 is depicted in accordance with an advantageous embodiment. During pre-production, the aerospace vehicle manufacturing and service method 100 may include a specification and design 102 of the aerospace vehicle 200 in FIG. 2 and material procurement 104. During production, component and subassembly manufacturing 106 and system integration 108 of the aerospace vehicle 200 in FIG. 2 takes place. Thereafter, the aerospace vehicle 200 in FIG. 2 may go through certification and delivery 110 in order to be placed in service 112. While in service 112 by a customer, the aerospace vehicle 200 in FIG. 2 is scheduled for routine maintenance and service 114, which may include modification, repair, reconfiguration, refurbishment, and other maintenance or service.

Each of the processes of the aerospace vehicle manufacturing and service method 100 may be performed or carried out by a system integrator, a third party, and/or an operator. In these examples, the operator may be a customer. For the purposes of this description, a system integrator may include, without limitation, any number of aerospace vehicle manufacturers and major-system subcontractors; a third party may include, without limitation, any number of venders, subcontractors, and suppliers; and an operator may be a company, a military entity, a service organization, and so on.

With reference now to FIG. 2, an illustration of an aerospace vehicle is depicted in which an advantageous embodiment may be implemented. The aerospace vehicle 200 may be any vehicle for operation in the air, in space, or both. For example, the aerospace vehicle 200 may be an aircraft, a spacecraft, or a vehicle that operates as both an aircraft and a spacecraft. In this example, the aerospace vehicle 200 is produced by the aerospace vehicle manufacturing and service method 100 in FIG. 1. The aerospace vehicle 200 may include a frame 202 with a plurality of systems 204 and an interior 206.

Examples of the systems 204 include one or more of a propulsion system 208, an electrical system 210, a hydraulic system 212, an environmental system 214, and a thermal protection system 216. Although an aerospace example is shown, different advantageous embodiments may be applied to other industries, such as the automotive industry.

Turning now to FIG. 3, an illustration of a space shuttle is depicted in accordance with an advantageous embodiment. In this example, a space shuttle 300 is one example of the aerospace vehicle 200 in FIG. 2. FIG. 3 illustrates a lower surface 302 of the space shuttle 300. In accordance with an advantageous embodiment, individual point locations on the lower surface 302 may be identified by points in a coordinate system 304. The coordinate system 304 may be a three-dimensional coordinate system defined with reference to the space shuttle 300. For example, an X-axis 306 of the coordinate system 304 may extend in the direction from a tail 308 to a nose 310 of the space shuttle 300. A Y-axis 312 of the coordinate system 304 may extend perpendicular to the X-axis 306 in the direction across wings 314 of the space shuttle 300. A Z-axis 318 of the coordinate system 304 may then extend perpendicular to both the X-axis 306 and the Y-axis 312 in the direction extending perpendicular to the page in FIG. 3. As will be known to those skilled in the art, individual point locations on a vehicle may be identified by points in coordinate systems other than the specific coordinate systems illustrated and described as examples herein.

Turning now to FIG. 4, an illustration showing in more detail a portion 400 of the lower surface 302 of the space shuttle 300 in FIG. 3 is depicted in accordance with an advantageous embodiment. The lower surface 302 of the space shuttle 300 is covered by an arrangement of thermal insulating tiles. For example, the portion 400 of the lower surface 302 includes tiles 402, 404, and 406. The tiles 402, 404, and 406 form a portion of a thermal protection system for the space shuttle 300.

FIG. 4 is not meant to illustrate an actual arrangement of tiles for a space shuttle or to present an accurate illustration of the shapes and dimensions of tiles or of the gaps between tiles for a thermal protection system for any vehicle. Rather, FIG. 4 is provided to illustrate some of the terms and concepts that are used in the descriptions of advantageous embodiments provided herein.

An impact of debris or other events may cause the formation of a feature on the tile 402. An example of one such feature is a cavity 408 in the tile 402. The cavity 408 also may be referred to as a nick, ding, or scrape in the tile 402. The cavity 408 may affect air flow across the tile 402. Therefore, the cavity 408 may affect aerodynamic heating of the tile 402 and, therefore, may affect performance of the thermal protection system for the space shuttle 300.

The location and orientation of the cavity 408 on the space shuttle 300 may be described using the locations of points 410 and 412. For example, the points 410 and 412 may be selected as points located at opposite ends of the cavity 408. In the example presented, the points 410 and 412 are selected such that an axis 413 extends between the points 410 and 412 across approximately the largest dimension of the cavity 408 at the surface of the tile 402. The points 410 and 412 may be identified as points in the coordinate system 304 in FIG. 3, or as points in another coordinate system. An angle of the axis 413 may define the angle of the cavity 408 in the coordinate system 304.

Another example of a feature that may be formed by the impact of debris or another event is a gap filler 414. For example, the gap filler 414 may be a piece of debris or other material that becomes lodged in a gap 416 between the tiles 404 and 406. The gap filler 414 may at least partially fill the gap 416 between the tiles 404 and 406. The gap filler 414 may protrude from the gap 416 beyond the surfaces of the adjacent tiles 404 and 406. The gap filler 414 may affect air flow across the surfaces of the tiles 404 and 406. Therefore, the gap filler 414 may affect aerodynamic heating of the space shuttle 300. The location of the gap filler 414 on the space shuttle 300 may be identified by identifying a side 418 or a side 420 of the tiles 404 or 406 adjacent to the gap filler 414.

The cavity 408 and the gap filler 414 are examples of unintended features. Such unintended features may be referred to as inconsistencies. Inconsistencies may result from the impact of debris on an aerospace vehicle or from other causes during pre-flight preparation or during operation of the vehicle. Other features on the surface of a vehicle thermal protection system may not be unintended features or inconsistencies. However, such other features also may affect air flow across the vehicle thermal protection system and, thus, may affect aerodynamic heating of the aerospace vehicle. Examples of such other features may include features that are part of the vehicle thermal protection system design.

The different advantageous embodiments recognize and take into account a number of considerations. For example, the different advantageous embodiments recognize and take into account that it may be important to determine accurately the aerodynamic effects of various features, such as inconsistencies, on the thermal protection system of an aerospace vehicle. An accurate determination of such aerodynamic effects may be needed, for example, to determine accurately the effects of the features on aerodynamic heating so that appropriate action may be taken, if needed. An accurate determination of the effect of an inconsistency or other feature on aerodynamic heating of a thermal protection system may be needed, for example, to determine whether the thermal protection system will perform as desired.

The different advantageous embodiments recognize and take into account that an accurate evaluation of a vehicle thermal protection system may be made using a simulation of aerodynamic heating. A simulation of aerodynamic heating may provide information on the heat that will be produced at the vehicle thermal protection system for a particular scenario, such as the reentry of an aerospace vehicle through the atmosphere. The effect of features in the thermal protection system on aerodynamic heating may be determined by including information on such features in a model of the thermal protection system that is used for the simulation. In this case, if the simulation indicates that heating of the thermal protection system is more than a desired amount, then maintenance, rework, or modification operations may be performed. For example, such operations may include rework or replacement of a portion of a thermal protection system that includes an inconsistency in the form of a cavity. As another example, such operations may include an operation to remove an inconsistency in the form of a gap filler from between tiles of a vehicle thermal protection system.

The different advantageous embodiments recognize and take into account that an accurate simulation of the effect on aerodynamic heating of a feature on a thermal protection system may require accurately determining the cross flow of air with respect to the feature. For example, an accurate determination of the effect of the cavity 408 or the gap filler 414 on aerodynamic heating of the space shuttle 300 during reentry may require an accurate determination of the cross flow angle of air at the cavity 408 or the gap filler 414 during reentry. The airflow across the lower surface 302 of the space shuttle 300 during reentry may be in the direction indicated by an arrow 422 in FIG. 4. In this case, for example, the cross flow angle for the cavity 408 or the gap filler 414 may be calculated as the angle between the direction of air flow indicated by the arrow 422 across the cavity 408 or the gap filler 414 and the angle of the cavity 408 or the gap filler 414, respectively.

The different advantageous embodiments recognize and take into account that it would be advantageous to enable effective reworking of inconsistencies in a thermal protection system before, during, and after operation of an aerospace vehicle. It also would be advantageous to facilitate reworking of such inconsistencies in a way that minimizes the time required to assess various rework approaches and which maximizes the accuracy of the design for such rework. Another advantageous capability would be to increase the precision with which such rework can be designed and affected in short time periods. Increased precision and speed in reworking inconsistencies in a vehicle thermal protection system may be particularly important for aerospace vehicles that are in use on an operational mission.

For example, consider the case of any type of aerospace vehicle that has ascended to orbit. While in orbit, inconsistencies in the vehicle thermal protection system may be discovered. Orbital missions of this type may have strict time limitations due to airframe limitations and limitations in fuel and crew provisions. Accordingly, it may be imperative that the effect of the inconsistency on aerodynamic heating during reentry be evaluated and that any necessary reworking be designed and effected while the vehicle is in orbit as quickly as possible, so as not to jeopardize the mission success.

Any necessary reworking of a vehicle thermal protection system may be made after an analysis of any discovered inconsistencies in the context of the operational environment, including the reentry environment. The different advantageous embodiments recognize and take into account that such an analysis preferably must include, among other considerations, a rapid and accurate determination of the cross flow angles of the reentry or other operational airstreams for the inconsistency. Information defining reentry or other operational airstreams for aerospace vehicles may be available from computational fluid dynamics (CFD) performance libraries and databases. The different advantageous embodiments recognize and take into account that rapid and effective evaluation and reworking of an inconsistency in the thermal protection system for such a vehicle may require quickly and accurately identifying the information in specific subsets of such performance libraries and databases for locations on the vehicle that are proximate to the identified inconsistencies.

The different advantageous embodiments provide a method and apparatus for determining cross flow angles for features in a surface of a structure. For example, the different advantageous embodiments provide a method and an apparatus for determining cross flow angles for features, such as inconsistencies, in a thermal protection system for an aerospace vehicle.

Advantageous embodiments may provide a method and apparatus for determining a cross flow angle for an inconsistency in the form of a cavity in a structure, such as a vehicle thermal protection system. In this example, a shear stress vector at the surface of the thermal protection system and a cavity angle may be used to determine automatically the cross flow angle for the cavity. A graphical output showing the computed cross flow angle along with a graphical representation of the cavity, the cavity angle, and air flow direction may be presented. The graphical output provides a graphical verification of the automated cross flow angle determination to a user.

Advantageous embodiments also may provide a method and apparatus for determining a cross flow angle for an inconsistency in the form of a protruding gap filler lodged between tiles of a vehicle thermal protection system. In this case, an angle between the side of a tile adjacent to the gap filler and a flow velocity vector at the location of the gap filler may be used to determine automatically the cross flow angle for the gap filler. An output showing the determined cross flow angle may be presented to a user in graphical form to provide a graphical verification of the cross flow angle determination to the user.

The different advantageous embodiments recognize and take into account that an automated system and method for accurately determining cross flow angles for inconsistencies and other features in a vehicle thermal protection system may be implemented in a computer system. Such an automated system may generate and display cross flow angles in a more rapid, efficient, and user-friendly manner than current mostly manual methods for determining cross flow angles. Thus, the different advantageous embodiments provide systems and methods for rapidly and accurately analyzing inconsistencies and other features in a vehicle thermal protection system. The advantageous embodiments also provide systems and methods for more efficiently reworking such inconsistencies, if needed. This advantage is achieved by more efficiently determining the cross flow parameters needed to make the analysis required to ensure that such reworking will withstand the aerodynamic heating of thermal protection system structures, surfaces, tiles, gap fillers, cavities, and the like.

Figure 5:
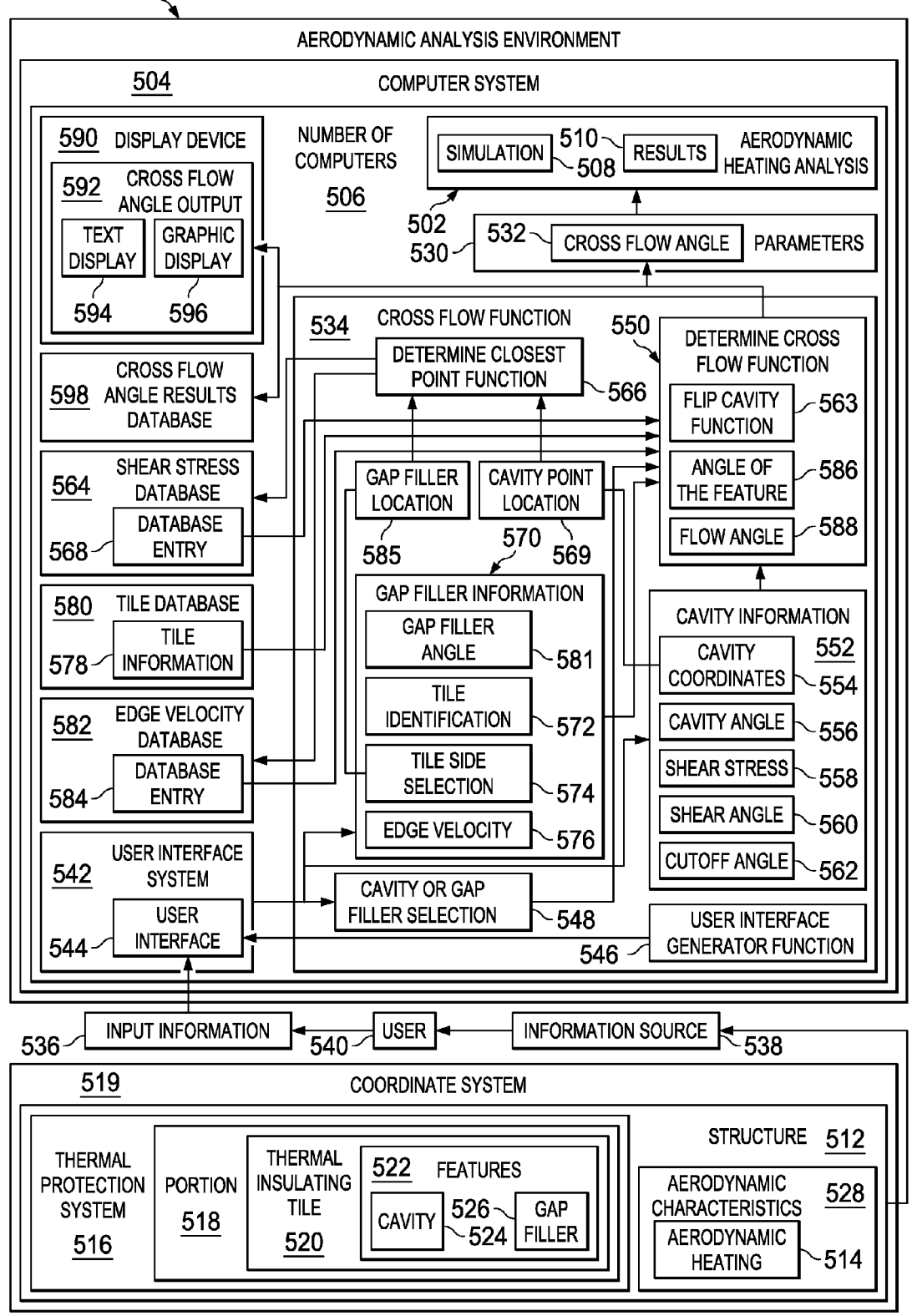
FIG. 5 is an illustration of a block diagram of an aerodynamic analysis environment in accordance with an advantageous embodiment.

Turning now to FIG. 5, an illustration of a block diagram of an aerodynamic analysis environment is depicted in accordance with an advantageous embodiment. In this example, an aerodynamic analysis environment 500 may be used to perform an aerodynamic analysis for an aerospace vehicle, such as for the aerospace vehicle 200 in FIG. 2. For example, the aerodynamic analysis environment 500 may be used to perform an aerodynamic heating analysis 502 of the thermal protection system 216 for the aerospace vehicle 200. In accordance with an advantageous embodiment, the aerodynamic analysis environment 500 may be an aerodynamic condition analyzer.

The aerodynamic analysis environment 500 may comprise a computer system 504. The computer system 504 may include a number of computers 506 in this example. When more than one computer is present in the number of computers 506, the number of computers 506 may be in communication with each other using wired or wireless communications links, or both. The number of computers 506 may be linked together by various communications links forming a network or other communications system.

In accordance with an advantageous embodiment, the aerodynamic analysis environment 500 may be implemented as a ground-based system, as a vehicle-based system, or as a system with the various functions thereof distributed between systems on the ground and systems in a vehicle. For example, without limitation, one or more functions of the aerodynamic analysis environment 500 may be implemented on board an aerospace vehicle, such as a spacecraft or aircraft. In any case, the aerodynamic analysis environment 500 may be used for aerodynamic analysis of a vehicle structure while the vehicle is in operation.

The aerodynamic heating analysis 502 may be performed using the number of computers 506. Alternatively, the aerodynamic heating analysis 502 may be performed using an aerodynamic heating analyzer. The aerodynamic heating analysis 502 may employ a simulation 508. The simulation 508 may comprise a simulation of aerodynamic heating of a structure 512. The simulation 508 is run to obtain results 510. The results 510 may comprise information describing the aerodynamic heating of the structure 512 for a particular scenario. The results 510 may be used to determine whether changes to the structure 512 are needed or desirable. For example, the results 510 may be used to determine whether maintenance, rework, or redesign of the structure 512 is needed or desirable. The simulation 508 may comprise any known computer implemented or other simulation of aerodynamic heating of a structure.

In one example, the structure 512 comprises a thermal protection system 516 or a portion 518 of a thermal protection system 516. For example, the thermal protection system 216 of the aerospace vehicle 200 in FIG. 2 may be one example of the thermal protection system 516 for the structure 512. Locations on the structure 512 may be identified by coordinates in a coordinate system 519. For example, the coordinate system 519 may be defined with respect to the structure 512.

In one embodiment, the thermal protection system 516 may be formed with a number of tiles. In this case, the portion 518 of the thermal protection system 516 may comprise, for example, a thermal insulating tile 520. In other embodiments, the thermal protection system 516 may not be formed from tiles.

The portion 518 of the thermal protection system 516, such as the thermal insulating tile 520, may include one or more features 522. For example, such features 522 may include a cavity 524 or a gap filler 526. As discussed above, such features 522 may be caused by the impact of debris on the thermal protection system 516 or by other events. Such features 522 also may be referred to as inconsistencies. Other features 522 may not be the result of unintended or undesirable impacts of debris or other events. For example, such other features 522 may comprise features that are part of the design of the thermal protection system 516. In any case, the presence of the features 522 may affect aerodynamic characteristics 528 of the structure 512. For example, the features 522 may affect aerodynamic heating 514 of the structure 512.

The simulation 508 may be run to determine the effects of the features 522 on the aerodynamic heating 514 of the structure 512. Various parameters 530 may be used in running the simulation 508. For determining the effects of the features 522 on the aerodynamic heating 514 of the structure 512, one of the parameters 530 is a cross flow angle 532. The cross flow angle 532 may be defined as an angle of airflow across the structure 512 with respect to at least one of the features 522. In accordance with an advantageous embodiment, the cross flow angle 532 may be determined by a cross flow function 534. In accordance with an advantageous embodiment, the cross flow function 534 may be implemented by software running in the computer system 504. In accordance with another advantageous embodiment, the cross flow function 534 may be implemented in a cross flow analyzer.

In accordance with an advantageous embodiment, the cross flow function 534 may generate the cross flow angle 532 at least in part from input information 536 provided by an information source 538. The information source 538 may be a human or an automatic system or device or a number of humans and machines operating in combination. The information source 538 may include any number of human sources, machine sources, or human and machine sources operating independently or in any combination and using any method to obtain the information to be provided as the input information 536 as described herein.

The information source 538 receives or obtains information about the features 522. For example, without limitation, the information about the features 522 may be obtained by the information source 538 via examination of photographic or video images of the portion 518 of the thermal protection system 516 that includes the features 522.

In one example, the portion 518 of the thermal protection system 516 that includes the features 522 may be the thermal insulating tile 520 forming part of the thermal protection system 516 of a space shuttle. In this example, the information source 538 may include members of a space shuttle operation imaging team. The members of the space shuttle operation imaging team may identify and obtain information regarding the features 522 of the space shuttle thermal protection system 516 by viewing images of the thermal protection system 516. Alternatively, such information may be obtained by or with the aid of automated image analysis of the images of the thermal protection system 516. In this case, for example, the information source 538 may include an automated image analysis system or function.

A user 540 may obtain the information to be entered as the input information 536 from the information source 538. For example, without limitation, the user 540 may be a human operator. Alternatively, the user 540 may be a machine operator or a human and machine operating together. The user 540 may obtain information from the information source 538 via any method, device, or system of communication between the information source 538 and the user 540. In one advantageous embodiment, the user 540 and the information source 538 may be one and the same. In another advantageous embodiment, the user 540 may be a part of the information source 538.

The user 540 may enter the input information 536 into the aerodynamic analysis environment 500 for use by the cross flow function 534 via a user interface system 542. The user interface system 542 may be implemented in any manner appropriate for receiving the input information 536 from the user 540. For a human user 540, the user interface system 542 may comprise conventional devices providing for interaction between the user 540 and the computer system 504. For example, without limitation, the user interface system 542 may comprise a monitor or other display device in combination with a keyboard, mouse, or other data entry device.

A user interface 544 may be provided on user interface system 542. For example, without limitation, the user interface 544 may be a graphical user interface. The user interface 544 may facilitate efficient and accurate input of the input information 536 into the aerodynamic analysis environment 500. The user interface 544 may be generated by a user interface generator function 546. The user interface generator function 546 may be implemented as part of the cross flow function 534 or as a separate application in communication with the cross flow function 534.

The user interface 544 may prompt the user 540 to select whether the cross flow angle 532 is to be determined for the cavity 524 or for the gap filler 526. In response to such prompting, the user 540 may make a cavity or gap filler selection 548. Different input information 536 may be used by the cross flow function 534 to determine the cross flow angle 532, depending upon whether the determination is to be made for the cavity 524 or for the gap filler 526. Therefore, the user interface generator function 546 may generate the user interface 544 to prompt the user 540 to enter the specific input information 536 that is needed for the determination of the cross flow angle 532 for either the cavity 524 or for the gap filler 526 based on the cavity or gap filler selection 548. The cavity or gap filler selection 548 also determines the processes that will be performed by a determine cross flow function 550 to generate the cross flow angle 532. The determine cross flow function 550 may be implemented as part of the cross flow function 534. Alternatively, the determine cross flow function 550 may be implemented in a cross flow calculator in communication with the cross flow function 534.

In one example, the cavity or gap filler selection 548 may indicate that the cross flow angle 532 is to be calculated for the cavity 524. In this case, the user interface generator function 546 may generate a graphical or other user interface 544 that prompts the user 540 to enter the input information 536 comprising cavity information 552. The cavity information 552 may comprise one or more of the following: cavity coordinates 554, a cavity angle 556, shear stress 558, a shear angle 560, and a cutoff angle 562. The cavity information 552 may be used by the determine cross flow function 550 to determine the cross flow angle 532 for the cavity 524.

The cavity coordinates 554 are coordinates that are used to identify the location and orientation of the cavity 524 in the coordinate system 519. For example, without limitation, the cavity 524 may be identified by the cavity coordinates 554 for a first point located on a first side of the cavity 524 and by the cavity coordinates 554 for a second point located on a second side of the cavity 524. Preferably, the first point and the second point are selected to be approximately centered on the first side and the second side, respectively, of the cavity 524. The first side and the second side of the cavity 524 preferably are opposite sides of the cavity 524 at the opposite ends of the longest dimension of the cavity 524 across the surface of the thermal insulating tile 520 or other portion 518 of the thermal protection system 516 or other structure 512.

The cavity angle 556 may identify the orientation of the longest dimension of the cavity 524 across the surface of the thermal insulating tile 520 or other portion 518 of the thermal protection system 516 or other structure 512. As will be described in more detail below, the cavity angle 556 may be determined by the determine cross flow function 550 from the cavity coordinates 554. Alternatively, the cavity angle 556 may be entered by the user 540 as part of the input information 536.

The shear stress 558 is the shear stress at the location of the cavity 524 on the thermal insulating tile 520 or other portion 518 of the thermal protection system 516 or other structure 512. The shear stress 558 also may be referred to as flow velocity at the location of the cavity 524. The shear stress 558 may be entered as the input information 536 by the user 540. For example, without limitation, the shear stress 558 may be entered by the user 540 as shear stress magnitudes in directions along axes of the coordinate system 519 at the location of the cavity 524.

As another alternative, the shear stress 558 at the location of the cavity 524 may be obtained or derived from information stored in a shear stress database 564. For example, without limitation, the shear stress database 564 may contain database entries for multiple point locations on the structure 512. Each such database entry may comprise shear stress properties for a corresponding point location on the structure 512 as calculated for a particular scenario. In one example, without limitation, the shear stress database 564 may contain shear stress properties for point locations on the surface of a space shuttle as calculated for a space shuttle reentry scenario at Mach 18.

The cross flow function 534 may employ a determine closest point function 566 to identify which database entry 568 in the shear stress database 564 contains the shear stress information that is to be used to determine the cross flow angle 532 for a particular cavity 524. For example, the determine closest point function 566 may identify the database entry 568 for a point location on the structure 512 that is closest to the location of the cavity 524 on the structure 512. The determine closest point function 566 may identify the desired database entry 568 using the cavity coordinates 554. For example, a cavity point location 569 may be determined to be the location of a center point between the two end points entered as the cavity coordinates 554, as described above. Distances between the determined cavity point location 569 and point locations on the structure 512 for which entries are provided in the shear stress database 564 may be determined. Efficient implementation of this distance determination will depend upon how point locations are represented in the shear stress database 564. The database entry 568 for a point location on the structure 512 having the shortest determined distance to the cavity point location 569 may be selected as the database entry 568 from which shear stress information for the cavity 524 is obtained. The shear angle 560 for the cavity 524 also may be determined from the shear stress information retrieved from the selected database entry 568.

The shear angle 560 is the angle of the shear stress 558 at the location of the cavity 524. The shear angle 560 may be referred to also as the flow angle. As will be described in more detail below, the shear angle 560 may be determined by determine cross flow function 550 from the shear stress 558. Alternatively, the shear angle 560 may be entered by the user 540 as part of the input information 536.

The cutoff angle 562 is an angle value under which cross flow is to be considered negligible. In accordance with an advantageous embodiment, a default value for the cutoff angle 562 may be provided. For example, without limitation, the default value for the cutoff angle 562 may be about 30 degrees. The user 540 may override the default cutoff angle value by entering a different value for the cutoff angle 562 as the input information 536. In one advantageous embodiment, any value for the cutoff angle 562 up to about 45 degrees may be acceptable for entry by the user 540 as the input information 536. A limit of about 45 degrees for the value of the cutoff angle 562 may be provided, for example, because the determine cross flow function 550 may employ a flip cavity function 563. The flip cavity function 563 may operate to switch the cavity direction by about 90 degrees if the angle between the flow and the cavity centerline exceeds about 45 degrees.

In another example, the cavity or gap filler selection 548 may indicate that the cross flow angle 532 is to be calculated for the gap filler 526. In this case, the user interface generator function 546 may generate a graphical or other user interface 544 that prompts the user 540 to enter the input information 536 comprising gap filler information 570. For example, without limitation, the gap filler information 570 may comprise as follows: a tile identification 572, a tile side selection 574, and an edge velocity 576. The gap filler information 570 may be used by the determine cross flow function 550 to determine the cross flow angle 532 for the gap filler 526.

The tile identification 572 identifies the thermal insulating tile 520 adjacent to the gap filler 526. For example, without limitation, the tile identification 572 may comprise a tile number or other alphanumeric indicator for the thermal insulating tile 520.

The tile identification 572 may be used by the cross flow function 534 to locate and retrieve tile information 578 for the identified thermal insulating tile 520 from a tile database 580. The cross flow function 534 may obtain the correct tile information 578 from the tile database 580 by using the tile identification 572 to query the tile database 580 for a database entry for the thermal insulating tile 520 identified by the tile identification 572. The tile information 578 stored in the tile database 580 may comprise, for example, without limitation, information defining the shape and dimensions of the thermal insulating tile 520 and information defining the location and orientation of the thermal insulating tile 520 with respect to the structure 512.

The tile side selection 574 identifies a side of the thermal insulating tile 520 identified by the tile identification 572 that is adjacent to the gap filler 526. The tile side selection 574 may be made by the user 540 using a graphical or other user interface 544 that may be generated by the user interface generator function 546. The user interface generator function 546 may use the tile information 578 retrieved from the tile database 580 to generate the user interface 544 for making the tile side selection 574 by the user 540. For example, without limitation, the user interface generator function 546 may use the tile information 578 to generate a graphical representation of the thermal insulating tile 520 identified by the tile identification 572 as part of the user interface 544. The user 540 may then interact with this graphical representation as part of the user interface 544 to make the tile side selection 574.

A gap filler angle 581 is an angle of the gap filler 526 for which the cross flow angle 532 is to be determined. The gap filler angle 581 may be determined by the cross flow function 534 from the tile information 578 and the tile side selection 574. For example, without limitation, the gap filler angle 581 may be determined to be the angle of the side of the thermal insulating tile 520 identified by the tile side selection 574. This angle information may be retrieved from the tile information 578 for the relevant thermal insulating tile 520 in the tile database 580.

The edge velocity 576 is the velocity of air flow at the location of the gap filler 526. Values for the edge velocity 576 may be entered into the aerodynamic analysis environment 500 by the user 540 as the input information 536.

Alternatively, the edge velocity 576 at the location of the gap filler 526 may be retrieved from an edge velocity database 582. For example, without limitation, the edge velocity database 582 may comprise database entries for a number of point locations on the structure 512. Each of these database entries may comprise edge velocity information for the corresponding point location as determined for a particular scenario. In one example, without limitation, the edge velocity database 582 may comprise edge velocity information for a number of point locations on the surface of a space shuttle as determined for a space shuttle reentry scenario at Mach 18.

The cross flow function 534 may employ the determine closest point function 566 to identify a database entry 584 in the edge velocity database 582 from which edge velocity information may be retrieved to determine the cross flow angle 532 for a particular gap filler 526. For example, the determine closest point function 566 may be used to identify the database entry 584 in the edge velocity database 582 for a point location that is closest to a gap filler location 585. The gap filler location 585 is a location of the gap filler 526 on the structure 512 for which the cross flow angle 532 is to be determined. In one example, without limitation, the gap filler location 585 may be determined from the tile information 578 and the tile side selection 574.

For example, the gap filler location 585 may be determined to be the location of the midpoint of the side of the thermal insulating tile 520 identified by the tile side selection 574. Distances between the gap filler location 585 and the point locations for which database entries are provided in the edge velocity database 582 may be determined. Efficient implementation of the distance determination will depend upon how the point locations are represented in the edge velocity database 582. The database entry 584 for the point location in the edge velocity database 582 having the shortest determined distance to the gap filler location 585 may then be selected as the database entry 584 from which the edge velocity 576 used to determine the cross flow angle 532 of the gap filler 526 is obtained or determined.

In accordance with an advantageous embodiment, a cross flow angle 532 for one of the features 522 may be determined by the determine cross flow function 550 using an angle of the feature 586 and a flow angle 588. For example, the angle of the feature 586 may be the angle of one of the features 522 with respect to the structure 512. The flow angle 588 may be the angle of the flow of air or of another fluid with respect to the structure 512 at the location of the feature on the structure 512. For the cavity 524, for example, the angle of the feature 586 may be the cavity angle 556, and the flow angle 588 may be the shear angle 560. For the gap filler 526, for example, the angle of the feature 586 may be the gap filler angle 581, and the flow angle 588 may be determined from the edge velocity 576 in any known manner. In any case, the cross flow angle 532 may be determined by the determine cross flow function 550 as the angular difference between the angle of the feature 586 and the flow angle 588.

The cross flow angle 532 determined by the determine cross flow function 550 may be provided for use as one of the parameters 530 used in an aerodynamic heating analysis 502 or other aerodynamic analysis.

Alternatively, or additionally, the cross flow angle 532 may be presented on a display device 590. For example, without limitation, the display device 590 may comprise a computer monitor or any other display device associated with the computer system 504. The cross flow angle 532 may be presented on the display device 590 as a cross flow angle output 592 in one or more forms. For example, the cross flow angle output 592 may comprise a text display 594 of the cross flow angle 532, a graphic display 596 of the cross flow angle 532, or both.

The cross flow angle 532 may be presented to the user 540 on the display device 590. In this case, for example, the cross flow angle output 592 may be presented on the user interface system 542, and the display device 590 may be a component of the user interface system 542.

The graphic display 596 of the cross flow angle 532 may be presented in a manner such that the user 540 is able to verify easily that the cross flow angle 532, as determined by the cross flow function 534, is correct. For example, without limitation, the graphic display 596 may comprise a graphical representation of the cross flow angle 532 overlaid on an image or representation of the portion 518 of the structure 512 for which the cross flow angle 532 was determined. A graphical representation of the angle of the feature 586 or a graphical representation of the flow angle 588, or both, also may be included in the graphic display 596 of the cross flow angle 532.

The cross flow angle 532 also may be stored for later recovery and use. For example, without limitation, the cross flow angle 532 may be stored in a cross flow angle results database 598. The cross flow angle results database 598 may be a part of or separate from the computer system 504.

The cross flow angle 532 may be provided by the cross flow function 534 in different formats, depending on the intended use of the cross flow angle 532. For example, without limitation, the cross flow angle 532 may be provided in degrees for display on the text display 594. Alternatively or additionally, the cross flow angle 532 may be provided in radians for use in the simulation 508 or for other calculations using the cross flow angle 532 that may be performed in the aerodynamic analysis environment 500.

The illustration and description of the aerodynamic analysis environment 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, advantageous embodiments may be used to determine cross flow angles for features in various structures other than thermal protection systems. Advantageous embodiments may be used to determine cross flow angles for features on any surface of an aircraft, a ground vehicle, a car, a train, or any structure or component thereof for which a determination of the aerodynamic effect of a feature is desired. Furthermore, advantageous embodiments may be used to determine cross flow angles for features on structures that may be made of any material in which the presence of a feature may affect aerodynamic performance of the structure.

In some advantageous embodiments, the cross flow angle 532 may be used as an input for an aerodynamic analysis other than the aerodynamic heating analysis 502. For example, the cross flow angle 532 may be used as an input for any type of aerodynamic analysis where cross flow angle is a relevant factor.

The various functions illustrated in FIG. 5 may be implemented together in a single device or system at a single location or may be implemented on more than one device or system at one or more locations. As mentioned above, advantageous embodiments may be implemented in whole or in part on a vehicle, such as on an aerospace vehicle. Other advantageous embodiments may be implemented in whole or in part on a system located on the ground.

Figure 6:
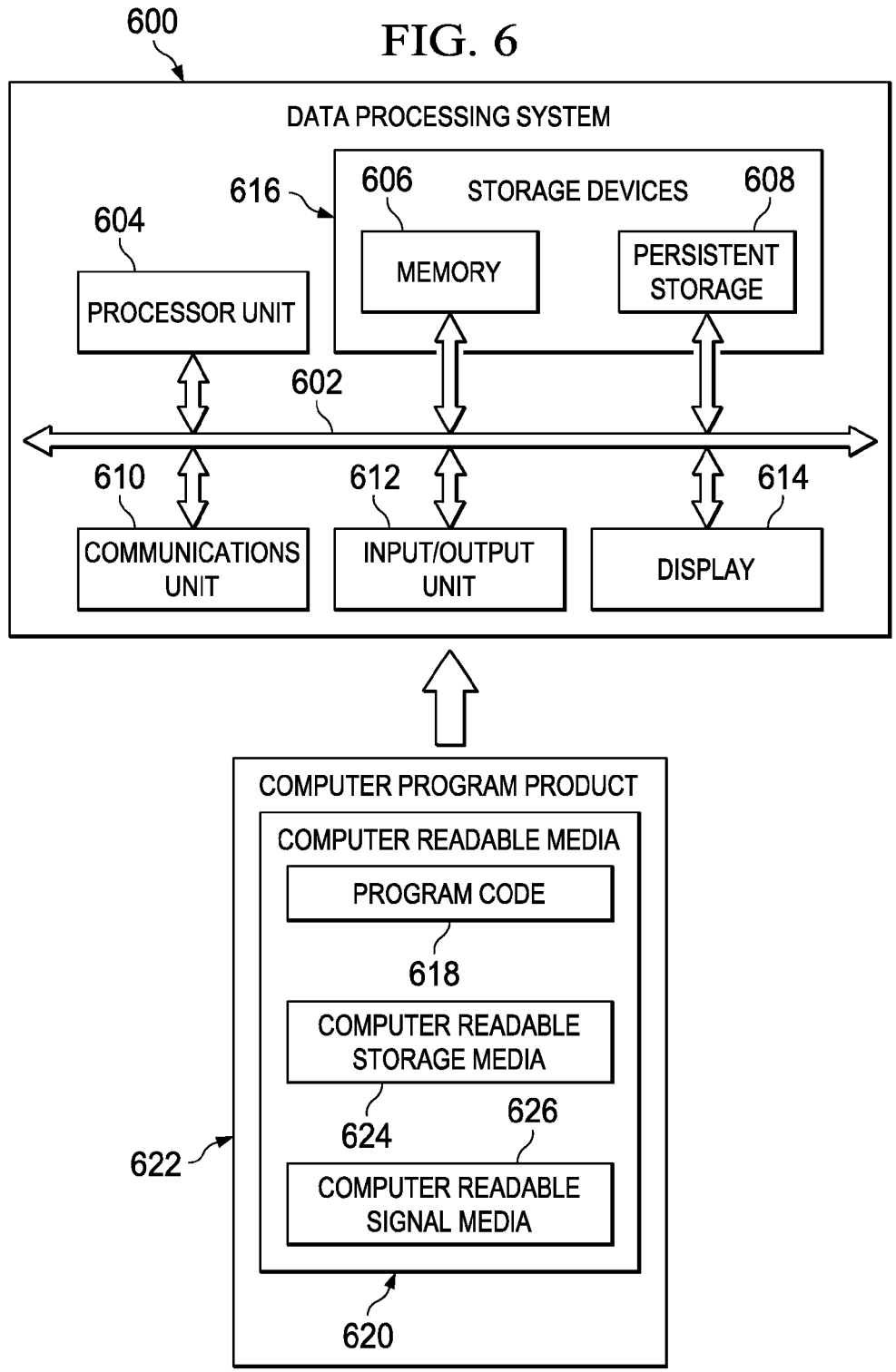
FIG. 6 is an illustration of a data processing system in accordance with an advantageous embodiment.

Turning now to FIG. 6, an illustration of a data processing system is depicted in accordance with an advantageous embodiment. In this advantageous example, a data processing system 600 to be described is an example of one implementation of the computer system 504 of FIG. 5. In this advantageous example, the data processing system 600 includes a communications fabric 602. The communications fabric 602 provides communications between a processor unit 604, a memory 606, a persistent storage 608, a communications unit 610, an input/output (I/O) unit 612, and a display 614.

The processor unit 604 serves to execute instructions for software that may be loaded into the memory 606. The processor unit 604 may be a set of one or more processors or may be a multi-processor core, depending on the particular implementation. Further, the processor unit 604 may be implemented using one or more heterogeneous processor systems, in which a main processor is present with secondary processors on a single chip. As another advantageous example, the processor unit 604 may be a symmetric multi-processor system containing multiple processors of the same type.

The memory 606 and the persistent storage 608 are examples of storage devices 616. A storage device is any piece of hardware that is capable of storing information, such as, for example, without limitation, data, program code in functional form, and/or other suitable information either on a temporary basis and/or a permanent basis. The storage devices 616 may also be referred to as computer readable storage devices in these examples. The memory 606, in these examples, may be, for example, a random access memory or any other suitable volatile or non-volatile storage device. The persistent storage 608 may take various forms, depending on the particular implementation. For example, the persistent storage 608 may contain one or more components or devices. For example, the persistent storage 608 may be a hard drive, a flash memory, a rewritable optical disk, a rewritable magnetic tape, or some combination of the above. The media used by the persistent storage 608 may be removable. For example, a removable hard drive may be used for persistent storage 608.

The communications unit 610, in these examples, provides for communication with other data processing systems or devices. In these examples, the communications unit 610 is a network interface card. The communications unit 610 may provide communications through the use of either or both physical and wireless communications links.

The input/output unit 612 allows for the input and output of data with other devices that may be connected to the data processing system 600. For example, the input/output unit 612 may provide a connection for user input through a keyboard, a mouse, and/or some other suitable input device. Further, the input/output unit 612 may send output to a printer. The display 614 provides a mechanism to display information to a user.

Instructions for the operating system, applications, and/or programs may be located in the storage devices 616, which are in communication with the processor unit 604 through the communications fabric 602. In these advantageous embodiments, the instructions are in a functional form on the persistent storage 608. These instructions may be loaded into the memory 606 for execution by the processor unit 604. The processes of the different embodiments may be performed by the processor unit 604 using computer-implemented instructions, which may be located in the memory 606.

These instructions are referred to as program instructions, program code, computer usable program code, or computer readable program code that may be read and executed by a processor in the processor unit 604. The program code, in the different embodiments, may be embodied on different physical or computer readable storage media, such as the memory 606 or the persistent storage 608.

Program code 618 is located in a functional form on computer readable media 620 that is selectively removable and may be loaded onto or transferred to the data processing system 600 for execution by the processor unit 604. The program code 618 and the computer readable media 620 form a computer program product 622. In one example, the computer readable media 620 may be computer readable storage media 624 or computer readable signal media 626. The computer readable storage media 624 may include, for example, an optical or magnetic disk that is inserted or placed into a drive or other device that is part of the persistent storage 608 for transfer onto a storage device, such as a hard drive, that is part of the persistent storage 608. The computer readable storage media 624 also may take the form of a persistent storage, such as a hard drive, a thumb drive, or a flash memory, that is connected to the data processing system 600. In some instances, the computer readable storage media 624 may not be removable from the data processing system 600.

Alternatively, the program code 618 may be transferred to the data processing system 600 using the computer readable signal media 626. The computer readable signal media 626 may be, for example, a propagated data signal containing the program code 618. For example, computer readable signal media 626 may be an electromagnetic signal, an optical signal, and/or any other suitable type of signal. These signals may be transmitted over communication links, such as wireless communication links, an optical fiber cable, a coaxial cable, a wire, and/or any other suitable type of communication link. In other words, the communication link and/or the connection may be physical or wireless in the advantageous embodiments.

In some advantageous embodiments, the program code 618 may be downloaded over a network to the persistent storage 608 from another device or data processing system through the computer readable signal media 626 for use within the data processing system 600. For instance, program code stored in a computer readable storage media in a server data processing system may be downloaded over a network from the server to the data processing system 600. The data processing system providing the program code 618 may be a server computer, a client computer, or some other device capable of storing and transmitting the program code 618.

The different components illustrated for the data processing system 600 are not meant to provide architectural limitations to the manner in which different embodiments may be implemented. The different advantageous embodiments may be implemented in a data processing system including components in addition to or in place of those illustrated for the data processing system 600. Other components shown in FIG. 6 can be varied from the advantageous embodiments shown. The different embodiments may be implemented using any hardware device or system capable of executing program code. As one example, the data processing system 600 may include organic components integrated with inorganic components and/or may be comprised entirely of organic components excluding a human being. For example, a storage device may be comprised of an organic semiconductor.

In another advantageous example, the processor unit 604 may take the form of a hardware unit that has circuits that are manufactured or configured for a particular use. This type of hardware may perform operations without needing program code to be loaded into a memory from a storage device to be configured to perform the operations.

For example, when the processor unit 604 takes the form of a hardware unit, the processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, the program code 618 may be omitted, because the processes for the different embodiments are implemented in a hardware unit.

In still another illustrative example, the processor unit 604 may be implemented using a combination of processors found in computers and hardware units. The processor unit 604 may have a number of hardware units and a number of processors that are configured to run the program code 618. With this depicted example, some of the processes may be implemented in the number of hardware units, while other processes may be implemented in the number of processors.

As another example, a storage device in the data processing system 600 is any hardware apparatus that may store data. The memory 606, the persistent storage 608, and the computer readable media 620 are examples of storage devices in a tangible form.

In another example, a bus system may be used to implement the communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, the memory 606 or a cache, such as found in an interface and memory controller hub that may be present in the communications fabric 602.

Figure 7:
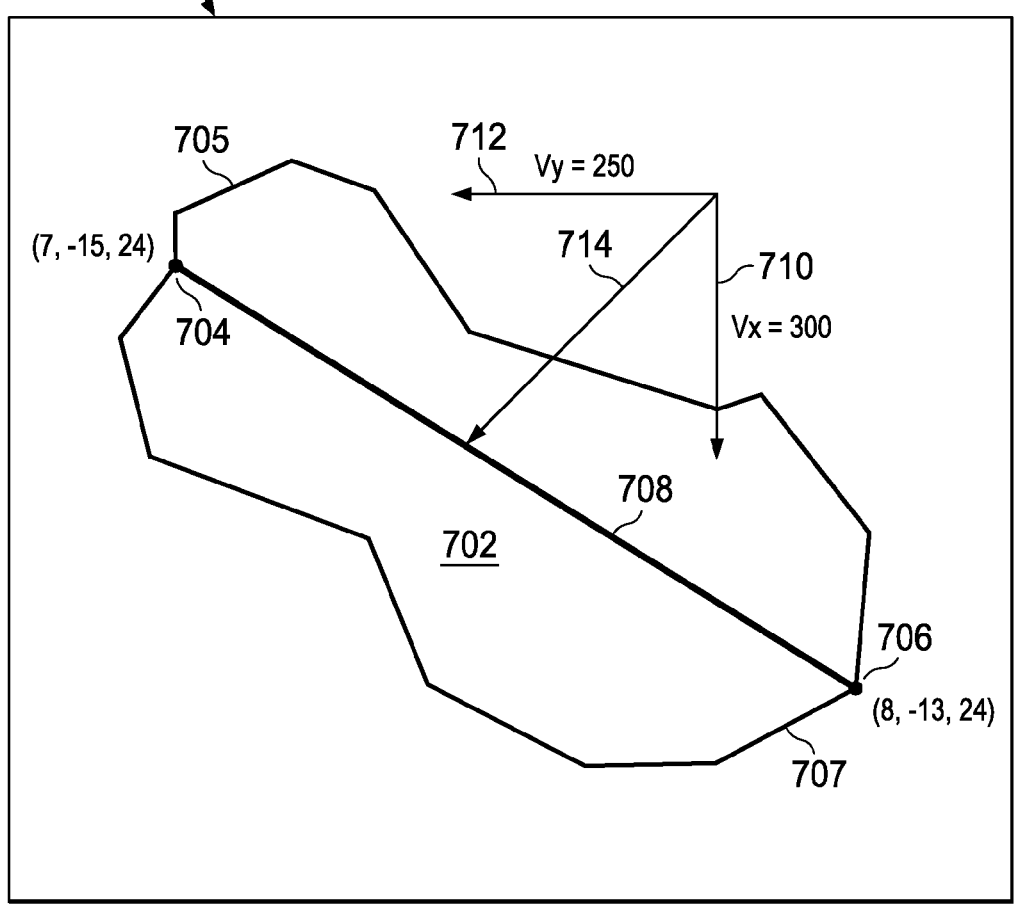
FIG. 7 is an illustration of a cavity in a thermal insulating tile in accordance with an advantageous embodiment.

Turning next to FIG. 7, a cavity in a thermal insulating tile is depicted in accordance with an advantageous embodiment. A cavity 702 is an example of a feature for which a cross flow angle may be determined in accordance with an advantageous embodiment. In this example, a thermal tile 700 and the cavity 702 may be examples of the thermal insulating tile 520 and the cavity 524 in FIG. 5. The thermal tile 700 and the cavity 702 are presented in FIG. 7 as notional examples for illustrating advantageous embodiments. Neither the thermal tile 700 nor the cavity 702 is intended to represent an actual structure.

A location and orientation of the cavity 702 may be identified by a first point 704 and a second point 706. The first point 704 is located on a first side 705 of the cavity 702. The second point 706 is located on a second side 707 of the cavity 702. Preferably, the first point 704 is selected to be approximately centered on the first side 705, and the second point 706 is selected to be approximately centered on the second side 707. The first side 705 and the second side 707 preferably are opposite sides of the cavity 702 located at opposite ends of the longest dimension of the cavity 702 across the surface of the thermal tile 700.

Locations of the first point 704 and the second point 706 in physical space may be identified by coordinates of a three-dimensional coordinate system. For example, three-dimensional coordinates may be used to locate the first point 704 and the second point 706 in a three-dimensional coordinate system defined with respect to a structure to which the thermal tile 700 is attached. In this example, the location of the first point 704 is defined by coordinates (7, −15, 24). The location of the second point 706 is defined by coordinates (8, −13, 24).

In accordance with an advantageous embodiment, the orientation of a line 708 extending between the first point 704 and the second point 706 defines an orientation of the cavity 702 in the coordinate space. In this disclosure, the orientation of the cavity 702 also may be referred to as the cavity angle or as the angle of the feature. The cavity angle for the cavity 702 may be determined from the locations of the first point 704 and the second point 706 using standard geometric calculations appropriate for the relevant coordinate system.

A first vector 710 indicates sheer stress in an X direction in the coordinate system at the location of the cavity 702 in the coordinate system. In this example, the first vector 710 has a shear stress magnitude of 300 in the X direction. A second vector 712 indicates shear stress in a Y direction in the coordinate system at the location of the cavity 702 in the coordinate system. In this example, the second vector 712 has a shear stress magnitude of 250 in the Y direction. Shear stress may be referred to alternatively as flow velocity at the surface of the thermal tile 700 in the location of the cavity 702.

The orientation of a third vector 714 represents the shear angle at the location of the cavity 702 in the coordinate system. The shear angle may be referred to alternatively as the flow angle. The third vector 714 may be derived from the X and Y components of the shear stress represented by the first vector 710 and the second vector 712 in a known manner.

Turning now to FIG. 8, an example user interface in accordance with an advantageous embodiment is illustrated. In this example, a user interface 800 is an example of a user interface for obtaining cavity information from a user. The cavity information obtained from the user via the user interface 800 may be used for determining a cross flow angle for the cavity. In this example, the user interface 800 is one example of an implementation of the user interface 544 in FIG. 5.

The user interface 800 may prompt a user to select either a first radio button 802 or a second radio button 804. If the first radio button 802 is selected, the user may enter three-dimensional coordinate information for a cavity. For example, without limitation, the user may be prompted to enter first three-dimensional coordinates 806 for the midpoint of one side of the cavity and second three-dimensional coordinates 808 for the midpoint of the opposite side of the cavity. In this example, the coordinates for the cavity 702 of FIG. 7 have been entered into the user interface 800 after the user selected the first radio button 802.

If the second radio button 804 is selected, the user may enter a cavity angle 810. As mentioned elsewhere in this disclosure, if the cavity angle 810 is not entered directly via the user interface 800, the cavity angle for the cavity may be determined from the provided first three-dimensional coordinates 806 and the second three-dimensional coordinates 808 in a known manner.

The user interface 800 also may prompt the user to select alternatively a third radio button 812, a fourth radio button 814, or a fifth radio button 816. If the third radio button 812 is selected, the user may enter magnitude values 818 for the shear stress in the X and Y directions at the location of the cavity. In this example, shear stress magnitudes for the example in FIG. 7 have been entered into the user interface 800 after the user selected the third radio button 812.

If the fourth radio button 814 is selected, a shear angle 820 at the cavity location may be entered. As mentioned elsewhere in this disclosure, if the shear angle 820 is not entered directly by the user via the user interface 800, the shear angle for the cavity location may be determined from the X and Y component shear stress magnitude values 818 in a known manner.

If the fifth radio button 816 is selected, the shear angle for the cavity location will be determined from shear stress information stored in a shear stress database. For example, without limitation, the shear stress database may comprise a number of database entries for a number of point locations on a structure. Each of the database entries may comprise shear stress information for the corresponding point location on the structure as determined for a particular scenario. In this example, the shear stress information in the shear stress database may comprise shear stress information determined for a space shuttle reentry scenario at Mach 18.

The database entry in the shear stress database from which the shear stress information will be obtained may be identified by first determining a point location for the cavity. For example, the point location for the cavity may be determined as the center point location between the locations of the points on the opposite sides of the cavity that were entered to identify the cavity location. Once the point location for the cavity is determined, the database entry in the shear stress database for the point location on the structure that is closest to the cavity point location may be identified. The shear stress information may then be obtained from this identified database entry to determine the shear angle for the cavity location.

The user interface 800 also may prompt the user to enter a cutoff angle 822. The cutoff angle 822 is the angle under which cross flow is to be considered negligible. In accordance with an advantageous embodiment, a default value for the cutoff angle 822 may be provided in the user interface 800. The user may use the user interface 800 to override the default cutoff angle value.

After entering the information required by the user interface 800, the user may be prompted to select a go button 824. Selecting the go button 824 may initiate the automatic determination of a cross flow angle for the defined cavity.

Figure 9:
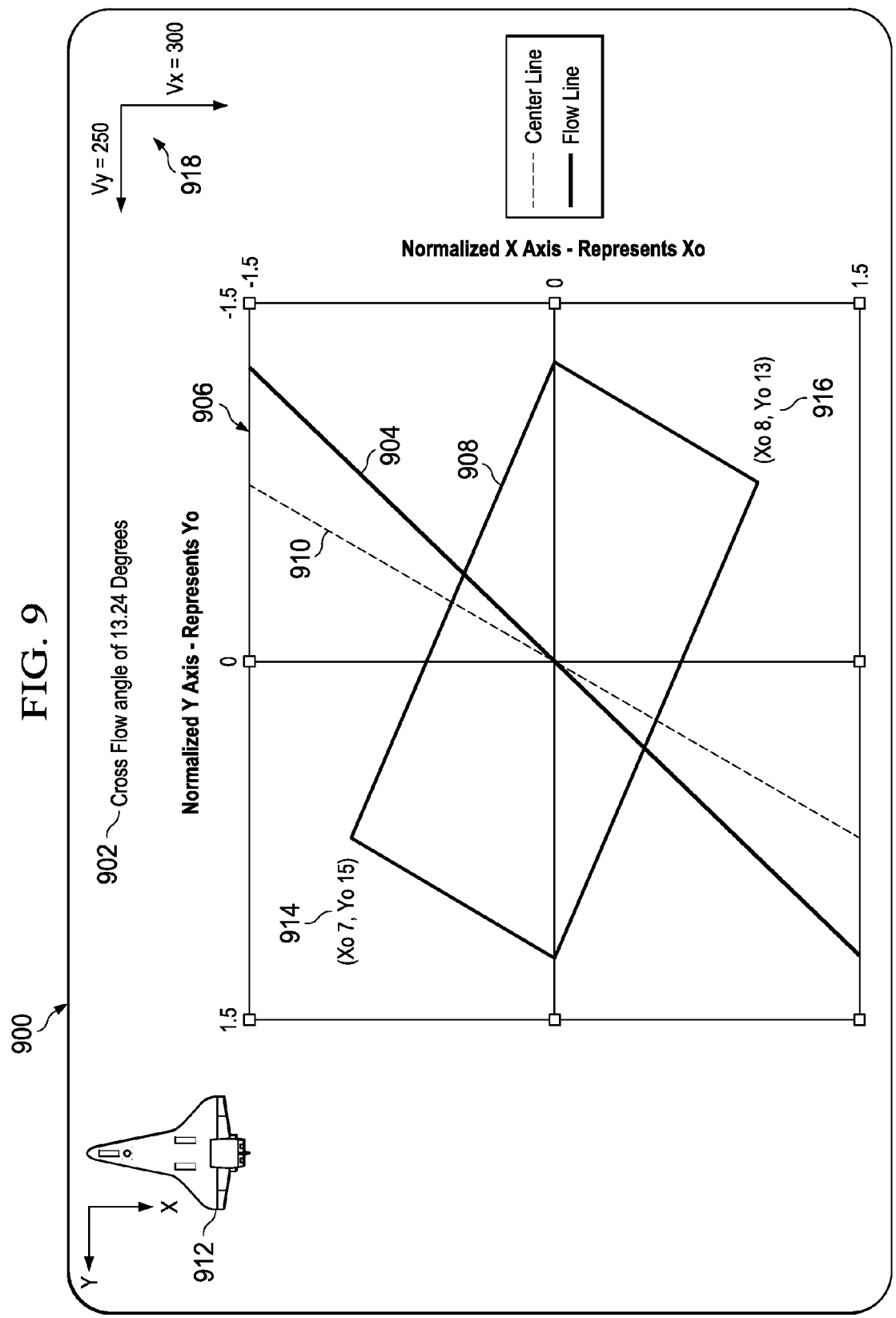
FIG. 9 is an illustration of a cavity cross flow angle output presentation in accordance with an advantageous embodiment.

Turning now to FIG. 9, an example output presentation is depicted in accordance with an advantageous embodiment. An example output presentation 900 displays a cavity cross flow angle. In this example, the output presentation 900 is one example of the cross flow angle output 592 of FIG. 5. The output presentation 900 displays the results of a cross flow angle determination for a cavity in multiple forms. For example, the cavity cross flow angle may be presented in a textual form 902.

The shear or flow angle with respect to the structure coordinate system at the location of the cavity on the structure may be represented in graphical form in the output presentation 900 as a flow line 904. In this example, the flow line 904 is overlaid on normalized axes 906. The angle of the flow line 904 with respect to the axes 906 indicates the shear or flow angle.

A cavity representation 908 also may be included in the output presentation 900. In this example, the cavity representation 908 may be a rough representation of the cavity that is provided to indicate the cavity angle with respect to the structure coordinate system. For example, without limitation, the cavity representation 908 may be a rectangle centered on the axes 906 with the orientation of the long axis of the rectangle indicating the cavity angle. A cavity centerline 910 also may be displayed in the output presentation 900. The cavity centerline 910 may be shown to run perpendicular to the long axis of the cavity representation 908. The orientation of the cavity centerline 910 also indicates the cavity angle. The angle between the flow line 904 and the cavity centerline 910 provides a graphical indication of the cross flow angle. The combined display of the flow line 904, the cavity representation 908, and the cavity centerline 910 in the output presentation 900 thus may provide for easy visual verification by a user of the cross flow angle determination.

The cross flow angle output presentation 900 may include additional graphics or other information to assist a user in understanding or verifying the cross flow angle determination being presented. For example, without limitation, a structure representation 912 may be provided in the output presentation 900. The structure representation 912 may be a representation of the structure on which the cavity is located. The structure representation 912 may be provided to illustrate the orientation of the axes 906 with respect to the structure. In this example, the structure representation 912 is a representation of a space shuttle orbiter.

Coordinates 914 and 916 and shear stress vectors 918 also may be displayed in the cavity cross flow angle output presentation 900. The displayed coordinates 914 and 916 may be the coordinates for the cavity that were entered by the user. The displayed shear stress vectors 918 may represent graphically and numerically the direction and magnitude of the shear stress that was used to determine the cross flow angle.

Figure 10:
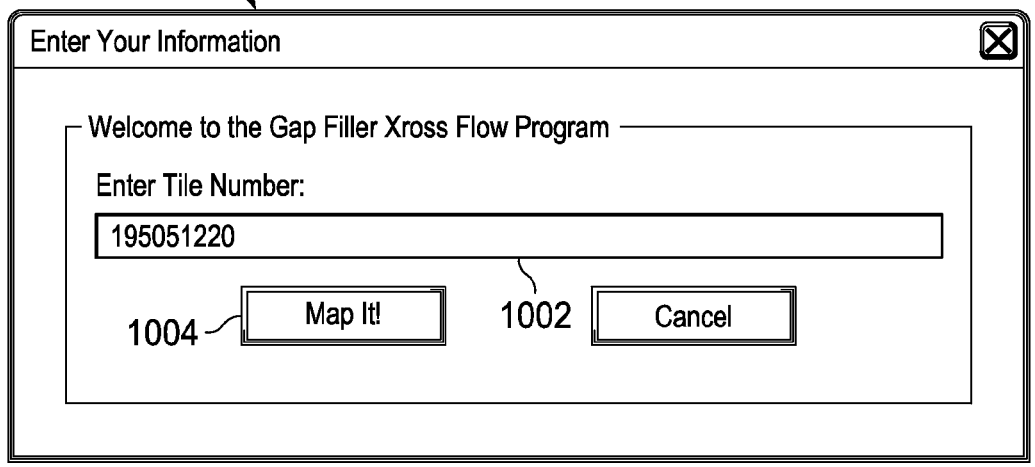
FIG. 10 is an illustration of a user interface for obtaining a tile identification that may be used for determining a cross flow angle for a gap filler in accordance with an advantageous embodiment.

Turning now to FIG. 10, another example of a user interface is depicted in accordance with an advantageous embodiment. In this example, a user interface 1000 is an example of a user interface for obtaining a tile identification from a user. The tile identification may be used for determining a cross flow angle for a gap filler lodged in a gap adjacent to the tile. In this example, the user interface 1000 is another example of the user interface 544 in FIG. 5.

The user interface 1000 may prompt the user to enter the identification of a tile adjacent to a gap filler for which a cross flow angle is to be determined. For example, without limitation, the user interface 1000 may prompt the user to enter a tile identification number 1002 to identify the tile. The entered tile identification number 1002 may be used to retrieve tile information for the identified tile from a tile database. The retrieved tile information may be used to generate the next user interface to be described herein. After the tile identification number 1002 is entered, the user may be prompted to select a map it button 1004 to proceed to the next user interface.

Figure 11:
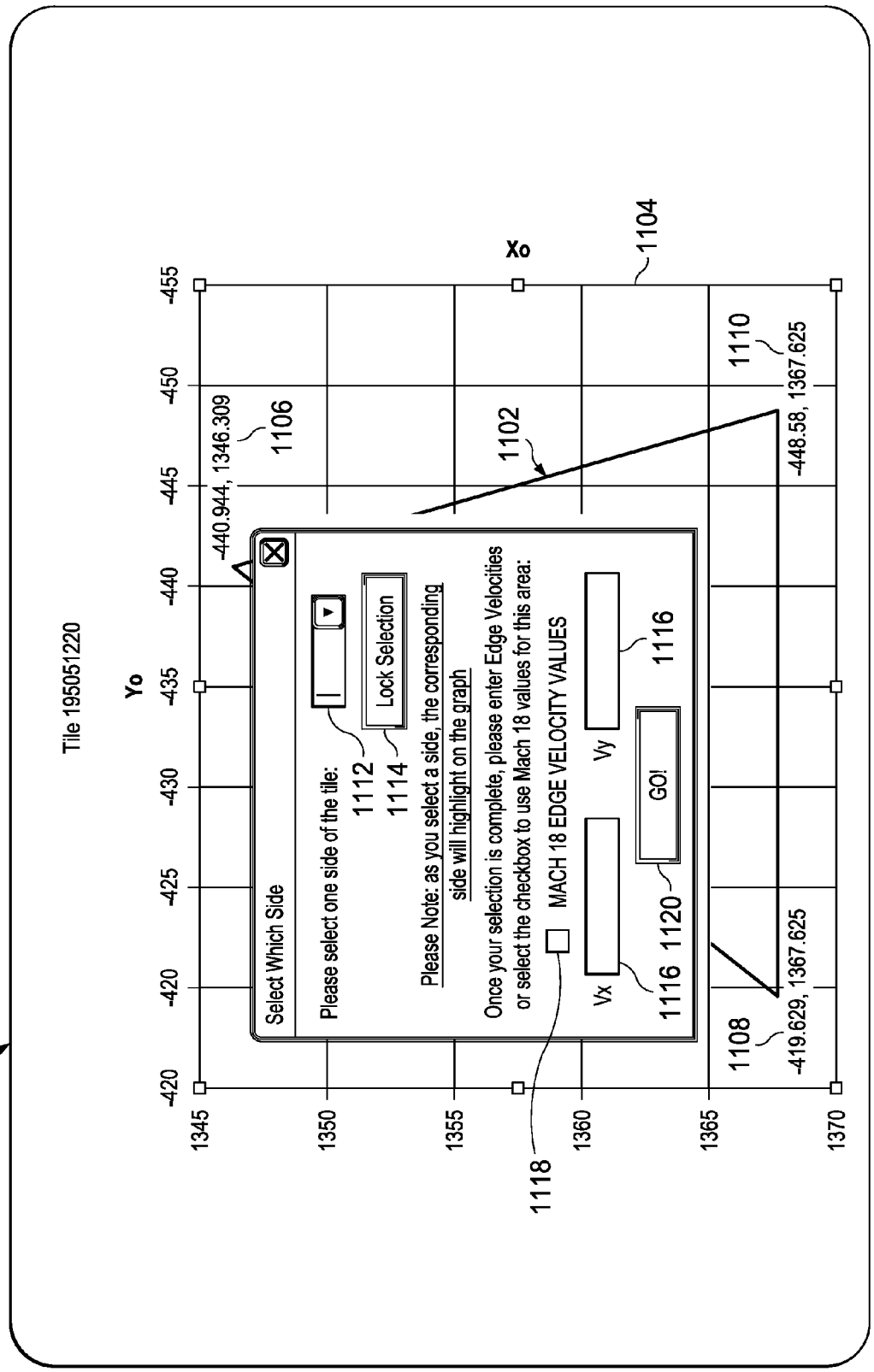
FIG. 11 is an illustration of a graphical user interface for obtaining a tile side selection and edge velocity information that may be used to determine a cross flow angle for a gap filler in accordance with an advantageous embodiment.

Turning now to FIG. 11, an example of another user interface is depicted in accordance with an advantageous embodiment. In this example, a user interface 1100 may be used to obtain a tile side selection and edge velocity information from a user. The tile side selection and the edge velocity information may be used to determine a cross flow angle for a gap filler. In this example, the user interface 1100 is another example of the user interface 544 of FIG. 5.

The user interface 1100 may include a graphical representation 1102 of the tile previously identified. The graphical representation 1102 may be generated from tile information for the identified tile that is obtained from a tile database. The graphical representation 1102 may represent the shape of the tile and the orientation of the tile with respect to the structure on which the tile is located. In this example, the represented tile is triangular in shape. The graphical representation 1102 may be overlaid on a coordinate grid 1104 showing a part of the coordinate system for the structure on which the tile is located. Coordinates 1106, 1108, and 1110 for the corners of the tile in this coordinate system also may be displayed.

A pull-down menu 1112 or other interface may prompt the user to make a side selection by selecting one of the sides of the represented tile that is adjacent to the gap filler for which a cross flow angle is to be calculated. After a side selection is made, the side of the graphical representation 1102 corresponding to the side of the tile that was selected may be highlighted. For example, without limitation, the side of the graphical representation 1102 corresponding to the side of the tile selected may be displayed with a different color or line width. The side selection made using the pull-down menu 1112 may be locked by the user by selecting a lock selection button 1114. As discussed above, the side selection may be used to determine the angle of the gap filler. For example, the angle of the gap filler may be determined to be the angle of the selected side of the tile adjacent to the gap filler. The angle of the selected side of the tile may be determined from the tile information for the tile in the tile database.

The user interface 1100 also may prompt the user to enter edge velocity values 1116 for the location of the gap filler. For example, without limitation, the graphical user interface 1100 may prompt the user to enter X and Y direction magnitude values for the edge velocity at the location of the gap filler.

Rather than entering the edge velocity values 1116, the user may select a check box 1118. By selecting the check box 1118, the edge velocity for the gap filler location will be determined from edge velocity information stored in an edge velocity database. For example, without limitation, the edge velocity database may comprise database entries for a number of point locations on a structure. Each of the database entries may comprise edge velocity information for the corresponding point location as determined for a particular scenario. In this example, the edge velocity information in the edge velocity database may comprise edge velocity information determined for a space shuttle reentry scenario at Mach 18.

The database entry in the edge velocity database from which the edge velocity information will be obtained may be identified by first determining a point location for the gap filler. For example, the point location for the gap filler may be determined as the center point location of the selected side of the tile adjacent to the gap filler. This point location may be determined from the tile side selection and the tile information for the tile that may be retrieved from the tile database. Once the point location for the gap filler is determined, the database entry in the edge velocity database for the point location on the structure that is closest to the gap filler point location may be identified. The edge velocity information may then be obtained from this identified database entry to determine the edge velocity for the gap filler location.

After entering the information required by the user interface 1100, the user may be prompted to select a go button 1120. Selecting the go button 1120 may initiate the automatic determination of a cross flow angle for the gap filler.

Figure 12:
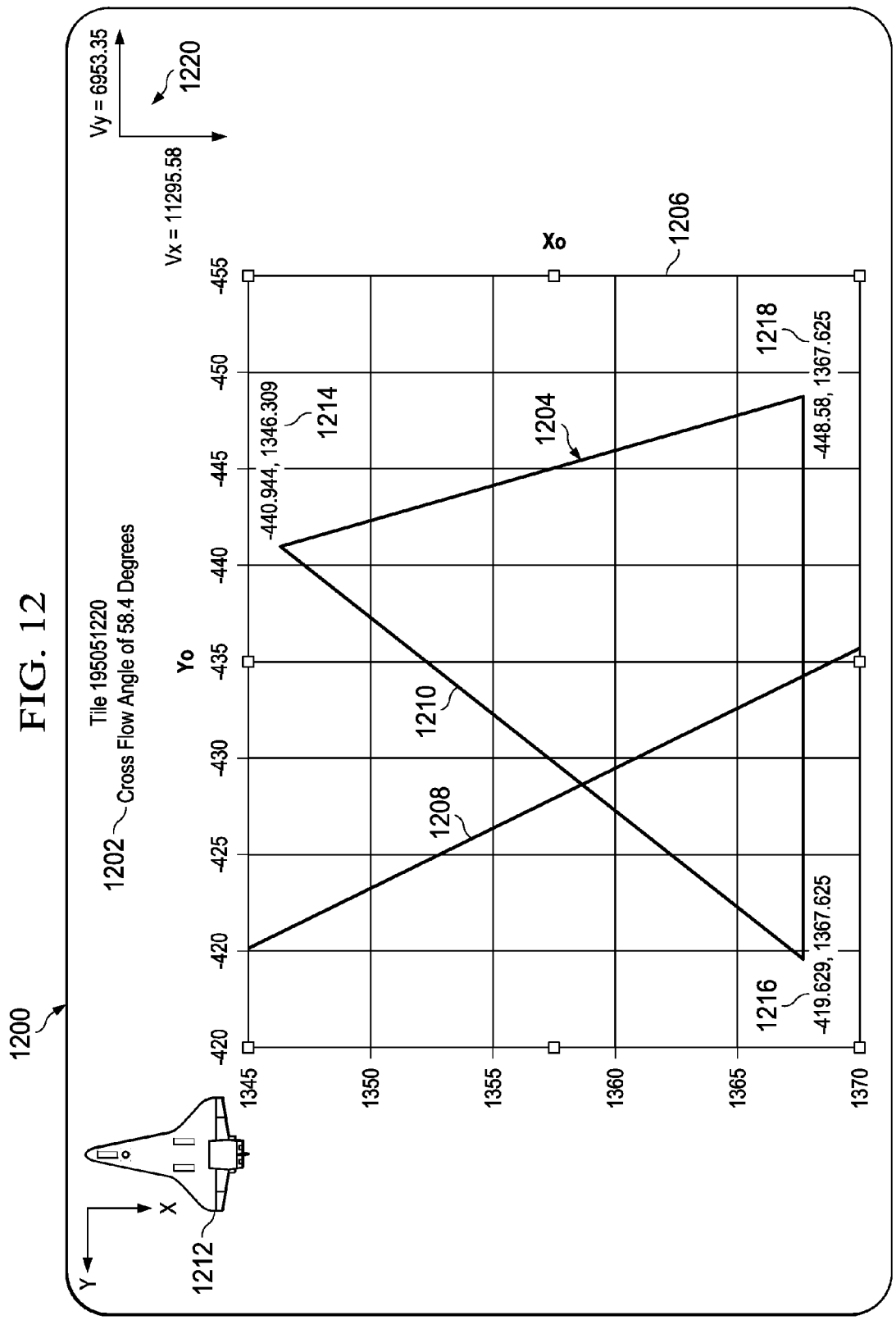
FIG. 12 is an illustration of a gap filler cross flow angle output presentation in accordance with an advantageous embodiment.

Turning now to FIG. 12, another output presentation is depicted in accordance with an advantageous embodiment. In this example, an output presentation 1200 displays a cross flow angle determined for a gap filler. In this example, the output presentation 1200 is another example of the cross flow angle output 592 of FIG. 5. The output presentation 1200 may display the cross flow angle determination for a gap filler in multiple forms. For example, the gap filler cross flow angle may be displayed in the output presentation 1200 in a textual form 1202.

The cross flow angle output presentation 1200 also may display a representation 1204 of the selected tile overlaid on a coordinate grid 1206. The representation 1204 may be generated from tile information for the identified tile that is obtained from a tile database. The representation 1204 may represent the shape of the tile and the orientation of the tile with respect to the structure on which the tile is located. In this example, the represented tile is triangular in shape. The coordinate grid 1206 may show a part of the coordinate system for the structure on which the tile is located. Coordinates 1214, 1216, and 1218 for the corners of the tile in this coordinate system also may be displayed.

A flow line 1208 also may be displayed on the output presentation 1200. The flow line 1208 may be displayed overlaid on the representation 1204 of the tile and the coordinate grid 1206. For example, the flow line 1208 may intersect a side 1210 of the representation 1204 of the tile corresponding to the selected side of the tile adjacent to the gap filler. The flow line 1208 may intersect the side 1210 of the representation 1204 of the tile at the midpoint thereof. As discussed above, the center of the side of the tile adjacent to the gap filler may correspond to the determined point location of the gap filler. Thus, the intersection point of the flow line 1208 and the side 1210 may indicate the location of the gap filler for which the cross flow angle is determined.

As discussed above, the orientation of the side 1210 corresponds to the gap filler angle. The orientation of the flow line 1208 may indicate the flow angle for the location of the gap filler. The flow angle for the location of the gap filler may be determined from the edge velocity for the location of the gap filler in a known manner. The angle between the flow line 1208 and the side 1210 provides a visual indication of the cross flow angle. The combined display of the flow line 1208 and the representation 1204 of the tile in the output presentation 1200 may thus provide for easy visual verification of the cross flow angle determination by the user.

The output presentation 1200 may include additional graphics or information to assist understanding or verification of the cross flow angle determination presented. For example, a structure representation 1212 may be displayed on output presentation 1200. The structure representation 1212 may be a representation of the structure on which the tile and the gap filler is located. The structure representation 1212 may be displayed to illustrate the orientation of the coordinate grid 1206 with respect to the structure. In this example, the structure representation 1212 is a representation of a space shuttle orbiter.

Velocity vectors 1220 also may be displayed in the output presentation 1200. For example, the velocity vectors 1220 may present graphically and numerically the direction and magnitude of the edge velocity at the location of the gap filler that was used to determine the displayed cross flow angle.

Figure 13:
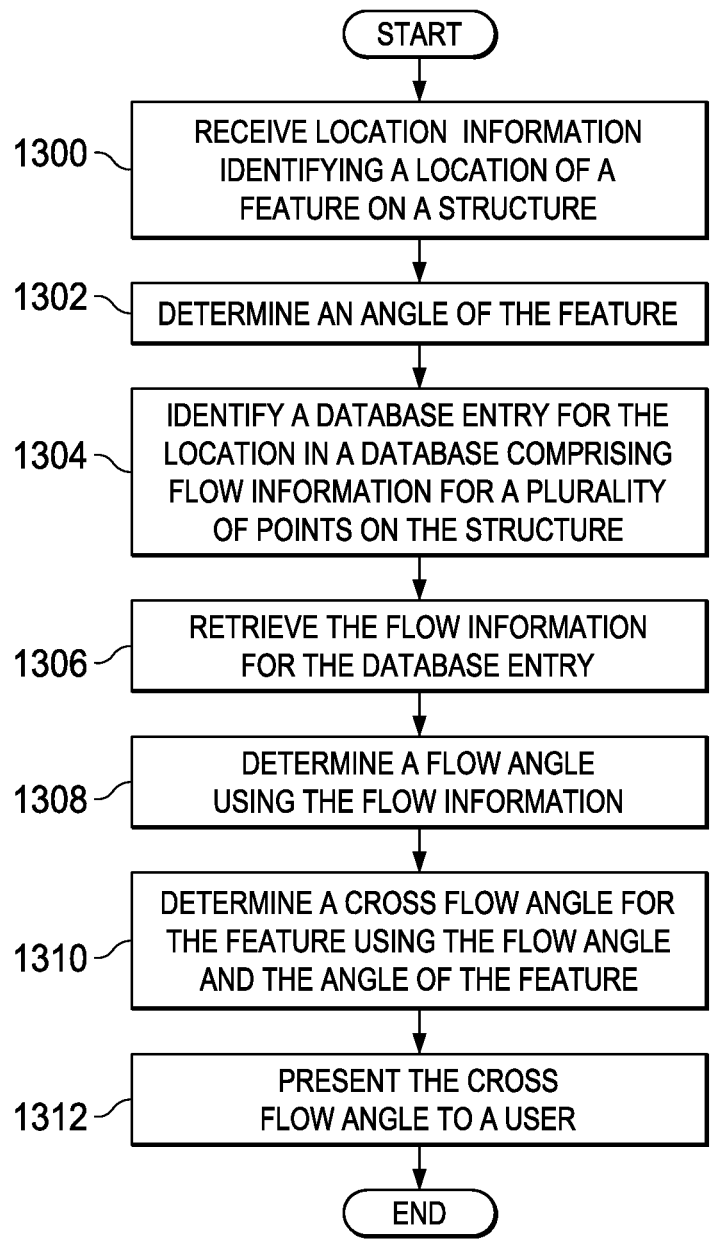
FIG. 13 is an illustration of a flowchart of a process for determining a cross flow angle in accordance with an advantageous embodiment.

Turning now to FIG. 13, an illustration of a flowchart of a process for determining a cross flow angle is depicted in accordance with an advantageous embodiment. The process illustrated in FIG. 13 may be implemented, for example, in the aerodynamic analysis environment 500 in FIG. 5.

A process for determining a cross flow angle in accordance with an advantageous embodiment may begin by receiving location information identifying a location of a feature on a structure (operation 1300). For example, the feature may be a cavity, gap filler, or other inconsistency or other feature that may affect the aerodynamic characteristics of the structure. The location information may be received, for example, by a computer system from a user via a user interface. The location information may comprise, for example, without limitation, coordinate information or information identifying a tile in a thermal protection system associated with the feature.

An angle of the feature is then determined (operation 1302). The angle of the feature may be determined with respect to a coordinate system that is defined with respect to the structure on which the feature is located. For example, the angle of the feature may be determined using the location information received in the operation 1300.

A database entry for the location is identified in a database comprising flow information for a plurality of points on the structure (operation 1304). The flow information may describe a flow of fluid across the structure. The operation 1304 may include determining a point location for the feature. The database entry may then be identified as the database entry for the point on the structure that is closest to the point location. The flow information for the identified database entry may then be retrieved (operation 1306).

A flow angle is then determined using the retrieved flow information (operation 1308). The flow angle may comprise an angle of the flow of fluid across the structure for the location of the feature. The cross flow angle for the feature may then be determined from the flow angle and the angle of the feature (operation 1310). The determined cross flow angle may then be presented to a user (operation 1312). For example, the operation 1312 may comprise presenting the cross flow angle to the user in multiple formats as part of a presentation displayed on a display device. After the cross flow angle is presented to the user, the process may terminate.

Figure 14B:
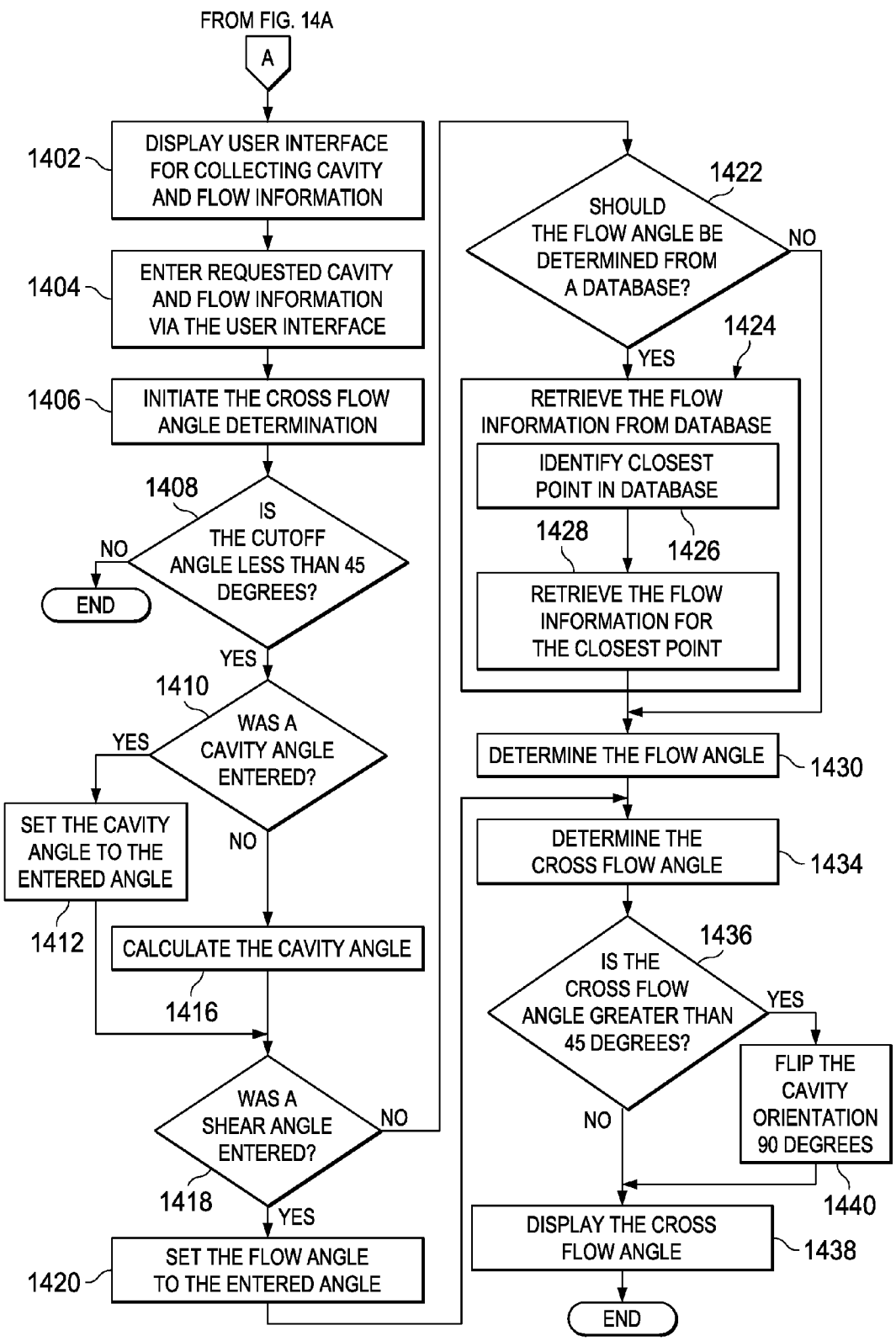

Turning now to FIGS. 14A and 14B, illustrations of a flowchart of another process for determining cross flow angles is depicted in accordance with an advantageous embodiment. The method of FIGS. 14A and 14B also may be implemented, for example, in the aerodynamic analysis environment 500 in FIG. 5.

A user may initially select whether a cross flow angle determination is to be performed for a cavity or for a gap filler (operation 1400). The operation 1400 may include presenting a mechanism on a user interface for the user to select either a cross flow angle determination for a cavity or a cross flow angle determination for a gap filler.

Responsive to selecting a cross flow angle determination for a cavity at the operation 1400, a user interface for collecting cavity and flow information may be displayed (operation 1402). The user then enters the requested cavity and flow information via the user interface (operation 1404). Cavity information provided by the user at the operation 1404 may comprise cavity coordinate information or cavity angle information.

Cavity coordinate information may include the coordinates of midpoints of opposite sides of the cavity. Flow information provided by the user at the operation 1404 may comprise shear stress information for the location of the cavity, shear angle information for the cavity location, or an indication to retrieve flow information for the location of the cavity from a database.

The operation 1404 also may include the user entering a cutoff angle or modifying a default cutoff angle provided on the user interface. After entering the required information at the operation 1404, the user may initiate the cross flow angle determination (operation 1406). The operation 1406 may include selecting a button in the graphical user interface provided in the operation 1402 to initiate the determination.

After initiating the cross flow angle determination, it may be determined whether the user entered or modified cutoff angle is less than 45 degrees (operation 1408). Only cutoff angles of less than 45 degrees make sense in the cross flow angle determination to be performed. Therefore, if the user entered or modified cutoff angle is not less than 45 degrees, the process terminates.

If the user entered or modified cutoff angle is less than 45 degrees, it may be determined whether a cavity angle was entered directly at the operation 1404 (operation 1410). If it is determined that a cavity angle was entered directly, the cavity angle is set to the entered angle (operation 1412). If it is determined that a cavity angle was not entered directly, the cavity angle is calculated (operation 1416). The operation 1416 may comprise determining the cavity angle from the cavity coordinate information entered at the operation 1404. For example, the operation 1416 may include determining the cavity angle as the orientation of a line extending through the midpoints of the opposite sides of the cavity for which coordinates were entered in the operation 1404.

After the cavity angle is determined by the operation 1412 or the operation 1416, it may be determined whether a shear angle was entered directly in the operation 1404 (operation 1418). If a shear angle was entered directly, the flow angle is set to the entered angle (operation 1420).

If a flow angle was not entered directly, it may be determined whether the user indicated that the flow angle should be determined from flow information for the cavity location that is obtained from a database (operation 1422). If it is determined that the flow information is to be retrieved from a database, the flow information for the location of the cavity is retrieved from a database (operation 1424). The operation 1424 may include identifying the database entry for a point on the structure that is closest to a point location of the cavity (operation 1426) and then retrieving the flow information for the database entry for the closest point (operation 1428). The operation 1426 may include determining the point location for the cavity as the location of the midpoint between the midpoints of the opposite sides of the cavity for which coordinates were entered in the operation 1404. The flow angle for the location of the cavity then may be determined from the flow information retrieved from the database in the operation 1424 (operation 1430).

If it is determined at the operation 1422 that flow information from a database will not be used to determine the flow angle, then the flow angle may be determined at step 1430 from the shear stress information entered at the operation 1404.

After determining the flow angle at the operation 1420 or the operation 1430, the cross flow angle for the cavity may be determined (operation 1434). The cross flow angle may be determined as the angle between the cavity angle and the flow angle. It may be determined whether the cross flow angle is greater than 45 degrees (operation 1436). If it is determined that the cross flow angle is not greater than 45 degrees, the cross flow angle may be displayed (operation 1438), with the process terminating thereafter. The operation 1438 may include generating and presenting textual and graphical representations of the cross flow angle on a user display device.

If the cross flow angle is determined to be greater than 45 degrees, the orientation of the cavity angle used to determine the cross flow angle may be flipped by 90 degrees (operation 1440). For example, the orientation of the cavity angle may be flipped by flipping the X and Y axes in the coordinate system in which the cavity angle is represented. Thus, if the cross flow angle is greater than 45 degrees, the long edge of the cavity may be moved from more parallel to the X axis to more perpendicular to the X axis. For example, if the cross flow angle determined in the operation 1434 is 80 degrees, the operation 1440 would make the short edge of the cavity more parallel to the X axis, and the new cross flow angle would be 10 degrees. The cross flow angle may then be displayed in the operation 1438, with the process terminating thereafter. The operation 1440 makes it so the cross flow angle displayed in the operation 1438 never exceeds 45 degrees.

Returning now to the operation 1400, in response to a user selecting a cross flow angle calculation for a gap filler at the operation 1400, a user interface for the user to identify a tile may displayed (operation 1442). The user may enter the requested tile identification via the interface (operation 1444). For example, the operation 1444 may include the user entering a tile number or other identification of a tile adjacent to the gap filler.

After the user identifies a tile, a tile database is searched for tile information for the identified tile (operation 1446). It may be determined whether tile information for the tile is found in the tile database (operation 1448). If information for the tile identified in the operation 1444 is not found in the tile database, an error may be indicated (operation 1450). The process then may return to the operation 1442, where the user may enter another tile identification. If tile information for the identified tile is found in the operation 1448, the tile information for the identified tile may be retrieved (operation 1452).

A user interface for making side and edge velocity selections may then be displayed to the user (operation 1454). The operation 1454 may include generating the user interface using the tile information retrieved in the operation 1452. For example, user interface displayed in the operation 1454 may include a graphical representation of the identified tile. The graphical representation of the tile may be generated based on shape and orientation information for the tile in the tile information retrieved from the tile database.

The user then may select a side of the tile and may enter edge velocity information for the location of the gap filler using the provided interface (operation 1456). For example, the user may select the side of the tile adjacent to the gap filler for which the cross flow angle is to be determined. The user may make this side selection by selecting the appropriate side of the representation of the tile displayed in the user interface. The operation 1456 also may include entering X and Y component edge velocity values for the location of the gap filler. Alternatively, the operation 1456 may include selecting by the user an option to retrieve edge velocity information stored in an edge velocity database.

A point location of the gap filler may then be determined (operation 1458). For example, the operation 1458 may include determining the point location of the gap filler as the midpoint of the tile side selected by the user in the operation 1456.

It may then be determined whether the user indicated at the operation 1456 that edge velocity information for the location of the gap filler is to be retrieved from a database (operation 1460). If it is determined that edge velocity information is to be retrieved from a database, the edge velocity information is retrieved from the database (operation 1462).

The operation 1462 may include identifying the database entry in the edge velocity database for a point on the structure that is closest to the point location of the gap filler (operation 1464). The operation 1464 may include identifying the database entry for the closest point to the point location of the gap filler using the point location of the gap filler determined in the operation 1458. The edge velocity information may then be retrieved from the database entry for the point closest to the location of the gap filler (operation 1466). A flow angle may then be determined in a known manner from the edge velocity information retrieved from the database (operation 1468). If the user did not indicate at the operation 1460 that edge velocity information is to be retrieved from an edge velocity database to determine the flow angle, the X and Y component edge velocity values entered at the operation 1456 may be used to determine the flow angle in a known manner in the operation 1468.

The cross flow angle for the gap filler then may be determined (operation 1470). The operation 1470 may include determining the cross flow angle as the dot product of the flow angle determined in the operation 1468 and the angle of the selected tile side as determined from the tile information retrieved from the tile database in the operation 1452.

The cross flow angle may then be displayed (operation 1472), with the process terminating thereafter. The operation 1472 may include generating and presenting a textual and graphical display of the cross flow angle on a user display device.

Systems and methods in accordance with advantageous embodiments as disclosed herein may be used to determine cross flow angles for features on structures other than insulating tiles for spacecraft. For example, without limitation, advantageous embodiments may be used to determine cross flow angles for features on thermal protection systems for spacecraft or aircraft that are formed without the use of tiles and using any materials. For example, advantageous embodiments may be used to determine cross flow angles for features on thermal protection systems and other structures on spacecraft or aircraft made from ceramic composite materials, such as ceramic matrix composites, metals, metal ceramic matrix composites, carbon fiber composites, and/or any other materials.

Advantageous embodiments may be used to determine cross flow angles for features on spacecraft and aircraft structures or components other than thermal protection system structures. For example, advantageous embodiments may be used to determine cross flow angles for features on control surfaces, engine components, and the like.

Systems and methods in accordance with advantageous embodiments may be used to determine cross flow angles for features on any surface where the presence of such features may affect the aerodynamic characteristics of the surface. Cross flow angles determined in accordance with advantageous embodiments may be used to perform aerodynamic analysis of such surfaces. Such aerodynamic analysis may include aerodynamic heating analysis or any other aerodynamic analysis of interest in which cross flow may be a factor.

The results of an aerodynamic analysis using cross flow angles determined in accordance with advantageous embodiments may be used to make rework or design decisions. Such an aerodynamic analysis may be performed during operation of a spacecraft or aircraft either on board the vehicle or remotely. In either case, the results of the aerodynamic analysis may be used to make rework decisions or other decisions in real time during vehicle operation. Such an aerodynamic analysis may also be performed before a spacecraft or aircraft enters operation or after a vehicle completes operation. In either case, the results of the analysis may be used to make rework or design decisions.

As will be appreciated by those skilled in the art, advantageous embodiments may be embodied as a system, method, or computer program product. Accordingly, advantageous embodiments may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, advantageous embodiments may take the form of a computer program product embodied in one or more computer readable medium having computer readable program code embodied thereon.

Any combination of one or more computer readable medium may be utilized. The computer readable medium may be a computer readable signal medium or a computer readable storage medium. A computer readable storage medium may be, for example, without limitation, an electronic, magnetic, optical, electromagnetic, infrared, or semiconductor system, apparatus, or device; or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain or store a program for use by or in connection with any system, apparatus, or device for running a program. A computer readable storage medium specifically excludes mere propagating signals.

A computer readable signal medium may include a propagated data signal with computer readable program code embodied therein, for example, in baseband or as part of a carrier wave. Such a propagated signal may take any of a variety of forms, including, without limitation, electromagnetic, optical, or any suitable combination thereof. A computer readable signal medium may be any computer readable medium that is not a computer readable storage medium and that can communicate, propagate, or transport a program for use by or in connection with any system, apparatus, or device for running a program.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the advantageous embodiments may be written in any combination of one or more programming languages, including an object-oriented programming language, such as Java, Smalltalk, C++, or the like; and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the advantageous embodiments are described with reference to flowcharts and/or block diagrams of methods, apparatus (systems), and computer program products according to various advantageous embodiments. It will be understood that each block of the flowcharts and/or block diagrams and combinations of blocks in the flowcharts and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions also may be stored in a computer readable medium that can direct a computer, other programmable data processing apparatus, or other devices to function in a particular manner such that the instructions stored in the computer readable medium produce an article of manufacture including instructions which implement the function/act specified in the flowchart and/or block diagram block or blocks.

The computer program instructions also may be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various advantageous embodiments. In this regard, each block in the flowcharts or block diagrams may represent a module, segment, or portion of code, which comprises one or more executable instructions for implementing the specified logical function. It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the different advantageous embodiments has been presented for purposes of illustration and description and is not intended to be exhaustive or to limit the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for determining a cross flow angle for a feature on a structure, wherein the feature comprises one of a cavity in the structure and a gap filler on the structure, the method comprising:
   receiving, by a processor, location information identifying a location of the feature on the structure;
   determining, by the processor, an angle of the feature;
   identifying, by the processor, flow information for the location, the flow information describing a flow of fluid across the structure;
   determining, by the processor, a flow angle using the flow information, the flow angle comprising an angle of the flow of fluid across the structure for the location of the feature; and
   determining, by the processor, the cross flow angle for the feature using the flow angle and the angle of the feature, wherein the cross flow angle comprises a first angle between a direction of the flow of the fluid across the structure and a second angle of the cavity or the gap filler.

2. The method of claim 1, wherein the feature comprises a cavity in the structure; and receiving the location information comprises receiving location information identifying coordinates of the cavity, wherein the coordinates of the cavity comprise first coordinates for a first point on a first side of the cavity and second coordinates for a second point on a second side of the cavity.

3. The method of claim 2 further comprising:
   determining the angle of the feature from the first coordinates and the second coordinates.

4. The method of claim 2 further comprising:
   determining a center point between the first point and the second point; and
   identifying the flow information for a point closest to the center point in a database comprising flow information for a plurality of points on the structure.

5. The method of claim 1, wherein the feature comprises a gap filler, and further comprising:
   receiving the location information comprising a tile identification identifying a tile adjacent to the gap filler in the structure;
   responsive to receiving the location information, retrieving tile information using the tile identification, the tile information describing a shape of the tile and an orientation of the tile on the structure;
   displaying a graphical representation of sides of the tile on a graphical user interface using the tile information;
   receiving via the graphical user interface, a selection of one of the sides of the tile adjacent to the gap filler;
   responsive to receiving the selection of the one of the sides, determining an angle for the one of the sides; and
   determining the angle of the feature from the angle for the one of the sides.

6. The method of claim 5, wherein the tile identification comprises a tile number.

7. The method of claim 5 further comprising:
   determining a point location for the gap filler, the point location comprising a midpoint of the one of the sides; and
   identifying the flow information for a point closest to the point location in a database comprising flow information for a plurality of points on the structure.

8. The method of claim 1 further comprising:
   performing, by the processor, an aerodynamic simulation using the cross flow angle.

9. An apparatus for determining a cross flow angle for a feature on a structure, the feature comprising one of a cavity and a gap filler, the apparatus comprising:
   a processor unit configured to:
   receive location information identifying a location of the feature on the structure;
   determine an angle of the feature;
   identify flow information for the location, the flow information describing a flow of fluid across the structure;
   determine a flow angle using the flow information, the flow angle comprising an angle of the flow of fluid across the structure for the location of the feature; and
   determine the cross flow angle for the feature using the flow angle and the angle of the feature, wherein the cross flow angle comprises a first angle between a direction of the flow of the fluid across the structure and a second angle of the cavity or the gap filler.

10. The apparatus of claim 9, wherein:
    the feature comprises a cavity in the structure; and
    the processor unit is configured to receive the location information identifying coordinates of the cavity; and
    the coordinates of the cavity comprise first coordinates for a first point on a first side of the cavity and second coordinates for a second point on a second side of the cavity.

11. The apparatus of claim 10, wherein the processor unit is configured to determine the angle of the feature from the first coordinates and the second coordinates.

12. The apparatus of claim 10, wherein the processor unit is configured to:
    determine a center point between the first point and the second point; and
    identify the flow information for a point closest to the center point in a database comprising flow information for a plurality of points on the structure.

13. The apparatus of claim 9, wherein the feature comprises a gap filler, and wherein the processor unit is further configured to:
    receive the location information comprising a tile identification identifying a tile adjacent to the gap filler in the structure;
    retrieve tile information using the tile identification, the tile information describing a shape of the tile and an orientation of the tile on the structure;
    display a graphical representation of sides of the tile on a graphical user interface using the tile information;
    receive, via the graphical user interface, a selection of one of the sides of the tile adjacent to the gap filler;
    determine an angle for the one of the sides; and
    determine the angle of the feature from the angle of the one of the sides.

14. The apparatus of claim 13, wherein the tile identification comprises a tile number.

15. The apparatus of claim 13, wherein the processor unit is further configured to:
   determine a point location for the gap filler, the point location comprising a midpoint of the one of the sides; and
   identify the flow information for a point closest to the point location in a database comprising flow information for a plurality of points on the structure.

16. A non-transitory computer readable storage medium storing a computer program product for determining a cross flow angle for a feature on a structure, the feature comprising one of a cavity and a gap filler, computer program product comprising:
   first program instructions to receive location information identifying a location of the feature on the structure;
   second program instructions to determine an angle of the feature;
   third program instructions to identify flow information for the location, the flow information describing a flow of fluid across the structure;
   fourth program instructions to determine a flow angle using the flow information, the flow angle comprising an angle of the flow of fluid across the structure for the location of the feature;
   fifth program instructions to determine the cross flow angle for the feature using the flow angle and the angle of the feature, wherein the cross flow angle comprises a first angle between a direction of the flow of the fluid across the structure and a second angle of the cavity or the gap filler; and
   wherein the first, the second, the third, the fourth, and the fifth program instructions are stored on the computer readable storage medium.

17. The non-transitory computer readable storage medium of claim 16, wherein:
   the feature comprises a cavity in the structure;
   the first program instructions comprise program instructions to receive location information identifying coordinates of the cavity;
   the coordinates of the cavity comprise first coordinates for a first point on a first side of the cavity and second coordinates for a second point on a second side of the cavity;
   the second program instructions comprise program instructions to determine the angle of the feature from the first coordinates and the second coordinates; and
   the third program instructions comprise program instructions to determine a center point between the first point and the second point, and to identify the flow information for a point closest to the center point in a database comprising flow information for a plurality of points on the structure.

18. The non-transitory computer readable storage medium of claim 16, wherein the feature comprises a gap filler, and wherein:
   the first program instructions comprise program instructions to receive the location information comprising a tile identification identifying a tile adjacent to the gap filler in the structure; and
   the second program instructions comprise program instructions to:
   retrieve tile information using the tile identification, the tile information describing a shape of the tile and an orientation of the tile on the structure,
   display a graphical representation of sides of the tile on a graphical user interface using the tile information,
   receive, via the graphical user interface, a selection of one of the sides of the tile adjacent to the gap filler,
   determine an angle for the one of the sides, and
   determine the angle of the feature from the angle for the one of the sides.

19. The non-transitory computer readable storage medium of claim 18, wherein the tile identification comprises a tile number.

20. The non-transitory computer readable storage medium of claim 18, wherein the third program instructions comprise additional program instructions to:
   determine a point location for the gap filler by determining a midpoint of the one of the sides; and
   identify the flow information for a point closest to the point location in a database comprising flow information for a plurality of points on the structure.

* * * * *